(12) United States Patent
Oishi et al.

(10) Patent No.: US 6,985,331 B2
(45) Date of Patent: Jan. 10, 2006

(54) MAGNETIC DISK CARTRIDGE WITH HOUSING COMPOSED OF CIRCULAR ARC AND STRAIGHT LINES NORMAL TO EACH OTHER

(75) Inventors: Kengo Oishi, Kanagawa-ken (JP); Go Shirouzu, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 220 days.

(21) Appl. No.: 10/293,433

(22) Filed: Nov. 14, 2002

(65) Prior Publication Data

US 2003/0095358 A1 May 22, 2003

(30) Foreign Application Priority Data

| Nov. 21, 2001 | (JP) | ............................. 2001-355661 |
| Dec. 20, 2001 | (JP) | ............................. 2001-387074 |
| Dec. 25, 2001 | (JP) | ............................. 2001-391964 |
| Dec. 26, 2001 | (JP) | ............................. 2001-392974 |
| Dec. 26, 2001 | (JP) | ............................. 2001-393412 |
| Mar. 22, 2002 | (JP) | ............................. 2002-080059 |

(51) Int. Cl.
  *G11B 23/033* (2006.01)
(52) U.S. Cl. .................................... 360/133
(58) Field of Classification Search ............... 360/133; 720/725, 728, 729, 730, 731, 741
See application file for complete search history.

(56) References Cited

U.S. PATENT DOCUMENTS

| 3,593,327 | A | * | 7/1971 | Shill ........................... 360/133 |
| 4,581,668 | A | * | 4/1986 | Campbell .................... 360/133 |
| 5,381,402 | A | * | 1/1995 | Lee et al. .................... 360/133 |
| 5,481,420 | A | * | 1/1996 | Cardona et al. ............ 720/728 |
| 5,930,090 | A | * | 7/1999 | Schick et al. ............... 360/133 |
| 6,081,410 | A | | 6/2000 | Batarseh et al. |
| 6,205,116 | B1 | * | 3/2001 | Hashimoto .................. 720/741 |
| 6,476,817 | B1 | * | 11/2002 | Harper et al. ............... 360/133 |
| 6,480,461 | B1 | * | 11/2002 | Watanabe et al. ........... 720/726 |

FOREIGN PATENT DOCUMENTS

| JP | 9-192580 | 7/1997 |
| JP | 11353845 A | * 12/1999 |

* cited by examiner

*Primary Examiner*—Craig A. Renner
(74) *Attorney, Agent, or Firm*—Sughrue Mion, PLLC

(57) ABSTRACT

A magnetic disk cartridge capable of being loaded into a disk drive comprises a housing, and a magnetic disk, which is accommodated for rotation within the housing. The housing is provided with an opening, which allows a magnetic head of the disk drive to access a surface of the magnetic disk, and a shutter for opening and closing the opening. The housing has an outer peripheral shape composed of a circular arc, which is formed along a contour of the magnetic disk, and two straight lines, which are circumscribed with the circular arc formed along the contour of the magnetic disk and are normal to each other.

20 Claims, 10 Drawing Sheets

MAGNETIC DISK CARTRIDGE WITH HOUSING COMPOSED OF CIRCULAR ARC AND STRAIGHT LINES NORMAL TO EACH OTHER

BACKGROUND OF THE INVENTION

1. Field of the Invention

This invention relates to a small-sized magnetic disk cartridge capable of being loaded in an exchangeable manner into a disk drive, which is located in a digital still camera, a digital video camera, a notebook size personal computer, or the like.

2. Description of the Related Art

Various types of recording media have heretofore been releasably loaded into card slots of electronic equipments, such as digital still cameras, digital video cameras, and notebook size personal computers, for recording and reproduction of information. As the recording media, various types of recording media, such as semiconductor memory types of recording media, hard disk types of recording media, optical disk types of recording media, and small-sized magnetic disk types of recording media, e.g. floppy disks, have been used in practice.

Of the above-enumerated recording media, the semiconductor memory types of recording media are most popular for easiness of processing and large recording capacities. However, the semiconductor memory types of recording media have the drawbacks in that the cost is comparatively high. Therefore, ordinarily, after imaging operations have been performed with the digital cameras utilizing the semiconductor memory types of recording media, image signals having been obtained from the imaging operations and stored on the semiconductor memory types of recording media are transferred from the semiconductor memory types of recording media into personal computers, and the like, and stored in the personal computers, and the like. Thereafter, the image signals having been stored on the semiconductor memory types of recording media are erased, and the semiconductor memory types of recording media having been erased are reused for storing image signals.

As the hard disk types of recording media, the recording media having a recording capacity of 340 MB and the recording media having a recording capacity of 1 GB are known. However, as in the cases of the semiconductor memory types of recording media, the hard disk types of recording media have the drawbacks in that the cost cannot be kept low. Therefore, ordinarily, after data have been stored on the hard disk types of recording media, the data are transferred from the hard disk types of recording media into different apparatuses and stored in the different apparatuses. Thereafter, the data having been stored on the hard disk types of recording media are erased, and the hard disk types of recording media having been erased are reused for storing data.

The optical disk types of recording media have comparatively large recording capacities for their small sizes. For example, the optical disk types of recording media having a size of 35 mm×41 mm×11 mm have a recording capacity of 256 MB. Also, recently, research has been conducted to develop an optical disk type of recording medium having a recording capacity of as large as 512 MB. However, the optical disk types of recording media have the drawbacks in that a long time is required to write information, and the recording speed is low.

As for the small-sized magnetic disk types of recording media, such as floppy disks, there have heretofore been known the magnetic disks, which have a small size of approximately 50 mm×55 mm×2 mm and are capable of being loaded in an exchangeable manner into disk drives having a size that allows the disk drives to be inserted into card slots of personal computers, and the like. However, the magnetic disks have the drawbacks in that the recording capacities are as small as 40 MG and are not sufficient for the recording of image signals obtained with cameras, and in that the sizes are not appropriate for the use in digital cameras.

Recently, digital cameras have rapidly become popular for easiness of information recording, enhanced image quality owing to development of imaging devices, possibility of erasing and transfer of image signals, large recording capacities, and the like, coupled with a social background in which personal computers have become popular. However, as described above, the costs of the recording media are high, and the recording capacities of the recording media are limited. Therefore, limitation is imposed upon the manner in which the recording media are used. For example, as described above, since the recording media are expensive, instead of a plurality of recording media being prepared for one camera, one recording medium is ordinarily used iteratively by, for example, transferring the recorded image signals into a personal computer when the recording medium is full of the image signals, and thereafter erasing the recorded image signals. Accordingly, the problems occur in that the recording medium becomes short of free recording region while the user of the recording medium is traveling, and in that the recording medium on which the image signals have been recorded cannot be preserved or given to another person.

Therefore, such that the users are capable of preserving the recording media, on which the image signals acquired with the digital cameras have been recorded, or are capable of freely giving the recording media to other persons, there is a strong demand for small-sized recording media, which have large recording capacities and are capable of being furnished at a low cost. Also, as for the recording media for use in personal computers, such that the users are capable of transferring the recording media, on which the data of the personal computers have been recorded, to other persons, there is a strong demand for small-sized recording media, which have large recording capacities and are capable of being furnished at a low cost.

In order for the demands described above to be satisfied, it may be considered to utilize recording media, which comprise a card type of disk drive capable of being loaded into electronic equipments, such as personal computers and digital cameras, and a magnetic disk cartridge capable of being loaded into the disk drive, as the small-sized recording media, which have large recording capacities and are capable of being furnished at a low cost, such that the users are capable of preserving the recording media, on which the image signals acquired with the digital cameras or the data of the personal computers have been recorded, or are capable of freely giving the recording media to other persons. Specifically, as the magnetic disk cartridge described above, it may be considered to utilize a magnetic disk cartridge having a recording capacity of, for example, at least 200 MB, and comprising a housing, which is provided with an openable shutter, and a flexible magnetic disk, which is capable of recording magnetic information at a high recording density and which is accommodated for rotation within the housing. As a high-recording-density magnetic recording medium for constituting the magnetic disk, a magnetic recording medium, which is provided with a thin metal film with a vacuum evaporation process of a sputtering process, or a magnetic recording medium, which utilizes barium ferrite particles or ferromagnetic metal particles, may be employed. The high-recording-density magnetic recording medium, which utilizes barium ferrite particles, is proposed in, for example, Japanese Patent Application No. 2001-312864 filed by the applicant.

The high-recording-density magnetic recording medium, which utilizes barium ferrite particles, is a magnetic disk, which comprises a magnetic layer containing the barium ferrite particles and utilizes the materials capable of achieving a high recording density. By way of example, the high-recording-density magnetic recording medium may be a magnetic recording medium proposed in Japanese Patent Application No. 2001-205290. The magnetic recording medium proposed in Japanese Patent Application No. 2001-205290 is a magnetic recording medium, comprising:

a non-magnetic substrate, a non-magnetic layer containing non-magnetic particles and a binder, and a magnetic layer containing ferromagnetic particles, which are hexagonal crystal system ferrite particles, and a binder, the non-magnetic layer and the magnetic layer being overlaid in this order on at least either one of two surfaces of the non-magnetic substrate, wherein the non-magnetic layer contains carbon black, which has an average particle diameter falling within the range of 10 nm to 30 nm, in a proportion ranging from 10 parts by mass per 100 parts by mass of the non-magnetic particles to 50 parts by mass per 100 parts by mass of the non-magnetic particles, the thickness of the magnetic layer is at most 0.2 $\mu$m, a standard deviation "b" of intensity with respect to a mean intensity "a" of elements due to the ferromagnetic particles, as analyzed with an electron beam microanalysis, satisfies the condition $0.03 \leq b/a \leq 0.4$, a surface roughness Ra, expressed in terms of arithmetic mean deviation, of the magnetic layer is at most 5 nm, and a 10-point mean roughness Rz of the magnetic layer is at most 40 nm.

With respect to the magnetic disk utilizing the material described above, for example, the recording and reproduction of information are performed by use of a magnetic head, such as an MR head, capable of achieving a high recording density.

With the proposed magnetic recording medium, a high-recording-density recording medium having a recording capacity of at least 200 MB, preferably at least 500 MB, is capable of being achieved. Therefore, with the proposed magnetic recording medium, for example, it becomes possible to record the image signals, which represent 500 still images, on one recording medium in cases where a recording capacity of approximately 1 MB is required per still image. Also, as for dynamic images, it becomes possible to record the imaged contents, which are taken for a period of approximately 30 minutes, on one recording medium. Accordingly, the image signals representing the dynamic images having been imaged with a digital camera, the image signals representing the dynamic images having been transmitted from a portable telephone, and the like, are capable of being recorded on the recording medium. As a result, serviceableness to the user who utilizes the imaged contents is capable of being enhanced. Also, in cases where the proposed magnetic recording medium is utilized in a personal computer, the magnetic recording medium is capable of being utilized conveniently as a low-cost, large-capacity data storage medium, and therefore the magnetic recording medium has a high serviceableness.

FIG. 14A is a schematic explanatory view showing a conventional magnetic disk cartridge, a disk drive, and an electronic equipment provided with a card slot, into which the disk drive is to be loaded. FIG. 14B is a schematic explanatory view showing a conventional magnetic disk cartridge, a disk drive, and a digital camera provided with a socket, into which the disk drive is to be loaded. In this specification, examples of the disk drives should preferably include a disk drive 6 for use in a personal computer, which disk drive is illustrated in FIG. 14A, a disk drive incorporated in a PC card, such as "click!" (trade name), and a disk drive 6' for use in a digital camera 3, or the like. As illustrated in FIG. 14A, the disk drive 6 is loaded to and electrically connected to a socket 4 of a receiving section of a PC card 2, which is to be inserted into a PC card receiving slot of the personal computer. Also, as illustrated in FIG. 14B, the disk drive 6' is loaded to and electrically connected to a socket of a receiving section 5 of the digital camera 3. Therefore, each of the disk drive 6 and the disk drive 6' has a markedly small size. For example, each of the disk drive 6 and the disk drive 6' has a length falling within the range of 38 mm to 55 mm, a width falling within the range of 35 mm to 51 mm, and a thickness falling within the range of 3 mm to 5 mm. Also, for example, each of a magnetic disk cartridge 8 shown in FIG. 14A and a magnetic disk cartridge 8' shown in FIG. 14B has a length falling within the range of 25 mm to 36 mm, and a thickness falling within the range of 1 mm to 3 mm.

It has been proposed to form a housing of a small-sized magnetic disk cartridge into a circular disk-like shape and to process the magnetic recording medium with a feeling of a coin. Specifically, it has been proposed to process the magnetic recording media with a light-hearted feeling as in the cases where coins are put into an automatic vending machine, and thereby to enhance the serviceableness of the magnetic recording medium.

However, in cases where the housing of the magnetic disk cartridge is formed into the circular disk-like shape, it is necessary that an orientation of the magnetic disk cartridge, in which the magnetic disk cartridge is to be inserted into the disk drive, is capable of being discriminated. Specifically, in cases where the housing of the magnetic disk cartridge is formed into the circular disk-like shape, the problems occur in that the magnetic disk cartridge is capable of being inserted into the disk drive regardless of the orientation of the shutter, which is secured in an openable manner to the housing of the magnetic disk cartridge. If the shutter openable secured to the housing of the magnetic disk cartridge is located at a position other than a predetermined position within the disk drive, the recording of information on the magnetic disk accommodated within the housing of the magnetic disk cartridge and the reproduction of the information from the magnetic disk cannot be performed. Therefore, it is necessary that the housing of the magnetic disk cartridge be located in a predetermined orientation with respect to the disk drive.

Also, for example, in cases where the magnetic disk cartridge is loaded into the disk drive, a position adjusting hole or a position adjusting recess of the housing of the magnetic disk cartridge is fitted onto and engaged with a protrusion formed on the side of the disk drive, and the magnetic disk cartridge is thus set at the predetermined position within the disk drive. However, if the engagement between the position adjusting hole or the position adjusting recess of the housing of the magnetic disk cartridge and the protrusion formed on the side of the disk drive is loose even slightly, the relationship between the position of the magnetic head of the disk drive, which magnetic head is capable of achieving a high recording density, and the position of the magnetic disk on the side of the magnetic disk cartridge will fluctuate, and the recording and reproducing characteristics will be affected adversely.

Further, since the size of the magnetic disk cartridge is markedly small, the problems occur in that the releasability of the magnetic disk cartridge from the disk drive is low, and the magnetic disk cartridge cannot be easily taken out from the disk drive.

Furthermore, since the size of the magnetic disk cartridge is markedly small such that the magnetic disk cartridge is capable of being processed with a feeling of a coin, when the magnetic disk cartridge is picked up between the fingers, the entire areas of the front and back surfaces of the magnetic disk cartridge are covered with the fingers. Therefore, it becomes difficult to confirm visually which surface is the front surface or the back surface of the magnetic disk cartridge. Also, in cases where both the front and back surfaces of the magnetic disk cartridge having the circular disk-shaped housing are constituted of approximately flat surfaces, there is the risk that the magnetic disk cartridge will be inserted into the disk drive in an incorrect orientation with respect to the front and back surfaces of the magnetic disk cartridge.

As described above, if the magnetic disk cartridge is inserted incorrectly into the disk drive, the magnetic disk cartridge will not be located at the predetermined position within the disk drive, and therefore the recording of information on the magnetic disk accommodated within the housing of the magnetic disk cartridge and the reproduction of the information from the magnetic disk cannot be performed. Accordingly, in such cases, the orientation of the magnetic disk cartridge, in which the magnetic disk cartridge is inserted into the disk drive, must be corrected, and the magnetic disk cartridge must again be inserted in the correct orientation into the disk drive. As a result, the operating efficiency cannot be kept high. Also, if the magnetic disk cartridge is inserted forcibly into the disk drive in an incorrect orientation with respect to the front and back surfaces of the magnetic disk cartridge, there will be the risk that the magnetic disk cartridge will breakdown. Therefore, there is a strong demand that the front and back surfaces of the magnetic disk cartridge are capable of being discriminated accurately.

Also, as for ordinary living necessaries, in order to protect users and consumers of the living necessaries, there have heretofore been taken safety countermeasures, such as attaching of sheets, on which instructions have been written, to the products. However, ordinarily, infants are apt to take anything into the mouths and do not have a sufficient discriminating capability. Therefore, troubles of infants due to swallowing by mistake and biting by mistake occur at a high trouble occurrence rate.

In view of the above circumstances, as for the markedly small magnetic disk cartridges described above, it is necessary to take safety countermeasures for preventing the troubles of infants due to swallowing by mistake and biting by mistake from occurring. Particularly, even though it may not occur that the magnetic disk cartridge is swallowed by mistake, if the magnetic disk cartridge is taken into the mouth or is licked, the saliva, and the like, will adhere to the recording surface of the magnetic disk cartridge, and an error in recording and reproduction of information will occur.

SUMMARY OF THE INVENTION

The primary object of the present invention is to provide a magnetic disk cartridge, which is capable of being reliably positioned in a predetermined orientation with respect to a disk drive when being inserted into the disk drive and is capable of achieving accurate recording and reproduction of information.

Another object of the present invention is to provide a magnetic disk cartridge, wherein engagement of the magnetic disk cartridge with part of a disk drive is capable of being prevented from becoming loose when the magnetic disk cartridge is inserted into the disk drive and set at a predetermined position within the disk drive in a manner engaged with the part of the disk drive, and wherein releasability of the magnetic disk cartridge from the disk drive at the time of taking of the magnetic disk cartridge from the disk drive is enhanced.

A further object of the present invention is to provide a magnetic disk cartridge, wherein front and back surfaces of the magnetic disk cartridge are capable of being accurately discriminated from each other.

The specific object of the present invention is to provide a magnetic disk cartridge, wherein the magnetic disk cartridge causes an infant, or the like, to vomit the magnetic disk cartridge immediately when the infant, or the like, takes the magnetic disk cartridge into the mouth, such that a trouble of the infant, or the like, due to swallowing by mistake or biting by mistake is capable of being prevented from occurring.

The present invention provides a first magnetic disk cartridge capable of being loaded into a disk drive, the magnetic disk cartridge comprising:

i) a housing, and ii) a magnetic disk, which is accommodated for rotation within the housing, wherein the housing is provided with an opening, which allows a magnetic head of the disk drive to access a surface of the magnetic disk, and a shutter for opening and closing the opening, and the housing has an outer peripheral shape composed of a circular arc, which is formed along a contour of the magnetic disk, and two straight lines, which are circumscribed with the circular arc formed along the contour of the magnetic disk and are normal to each other.

The first magnetic disk cartridge in accordance with the present invention should preferably be modified such that the housing is provided with two side walls, each of which extends along one of the two straight lines that are normal to each other, one of the two side walls of the housing extends in a direction, which is normal to a direction of insertion of the magnetic disk cartridge into the disk drive, and the other side wall of the housing extends in parallel with the direction of insertion of the magnetic disk cartridge into the disk drive.

In such cases, the first magnetic disk cartridge in accordance with the present invention should more preferably be modified such that the one side wall of the housing, which side wall extends in the direction normal to the direction of insertion of the magnetic disk cartridge into the disk drive, is formed at an end area of the housing on a trailing side with respect to the direction of insertion of the magnetic disk cartridge into the disk drive, and a dimension of the one side wall of the housing, which dimension is taken in a direction parallel with an axis of rotation of the magnetic disk, is larger than a thickness of a magnetic disk accommodating section of the housing.

In such cases, the first magnetic disk cartridge in accordance with the present invention should more preferably be modified such that a dimension of the other side wall of the housing, the side wall extending in parallel with the direction of insertion of the magnetic disk cartridge into the disk drive, which dimension is taken in the direction parallel with the axis of rotation of the magnetic disk, is larger than the thickness of the magnetic disk accommodating section of the housing.

In this case, the first magnetic disk cartridge in accordance with the present invention should more preferably be modified such that bottom edges of the two side walls of the housing are in the same plane as a bottom surface of a surface plate section of the housing, and top edges of the two side walls of the housing are projected above a top surface of the surface plate section of the housing.

Also, the first magnetic disk cartridge in accordance with the present invention should more preferably be modified such that an outer surface of each of the two side walls of the housing is slightly projected outwardly from a line circumscribed with an outer circumferential surface of a circumferential wall of the housing, which circumferential wall forms the circular arc formed along the contour of the magnetic disk, the circumscribed line being taken at a position on the outer circumferential surface, which position is adjacent to the outer surface of the side wall of the housing.

Further, the first magnetic disk cartridge in accordance with the present invention should more preferably be modified such that a corner area, which is formed between the two side walls of the housing, is formed at a corner of the housing on a trailing side with respect to the direction of insertion of the magnetic disk cartridge into the disk drive.

Furthermore, the first magnetic disk cartridge in accordance with the present invention should preferably be modified such that the housing is constituted of a lower shell and an upper shell, which is fitted into the side inward from the lower shell and from above, and all of constituent elements constituting the magnetic disk cartridge are assembled within the lower shell with a laying-up technique.

In such cases, the first magnetic disk cartridge in accordance with the present invention should more preferably be modified such that a lower shutter acting on the side of the lower shell is located on the side inward from the lower shell, an upper shutter acting on the side of the upper shell is located on the side outward from the upper shell, and the upper shell and the lower shell are coupled with each other on an anterior side of the opening of the housing and are capable of rotating together with each other.

In the first magnetic disk cartridge in accordance with the present invention (and in various other magnetic disk cartridges in accordance with the present invention, which will be described later), the magnetic disk should preferably be a high-recording-density magnetic recording medium, which utilizes barium ferrite particles.

The present invention also provides a second magnetic disk cartridge capable of being loaded through insertion into a disk drive, the magnetic disk cartridge comprising:

i) a housing, and ii) a magnetic disk, which is accommodated for rotation within the housing, wherein the housing is provided with urging means, which is located on a trailing side with respect to a direction of insertion of the magnetic disk cartridge into the disk drive, the urging means urging the magnetic disk cartridge toward a discharging direction in a state, in which the magnetic disk cartridge has been inserted into the disk drive and has been set through engagement at a predetermined position within the disk drive.

The second magnetic disk cartridge in accordance with the present invention should preferably be modified such that the housing is provided with a side wall formed at an end area of the housing on a trailing side with respect to a direction of insertion of the magnetic disk cartridge into the disk drive, the side wall extending in a straight line in a direction, which is normal to the direction of insertion of the magnetic disk cartridge into the disk drive, a top edge of the side wall being projected upwardly from a top surface of a surface plate section of the housing, and the urging means is constituted of a leaf spring region, which is formed at a top region of the side wall such that, when the magnetic disk cartridge has been inserted into the disk drive, the leaf spring region abuts elastically with an outer wall surface of the disk drive, the outer wall surface extending along a top edge of a cartridge receiving slot of the disk drive.

The present invention further provides a third magnetic disk cartridge capable of being loaded into a disk drive, the magnetic disk cartridge comprising:

i) a housing, and ii) a magnetic disk, which is accommodated for rotation within the housing, wherein the housing is provided with an opening, which allows a magnetic head of the disk drive to access a surface of the magnetic disk, and a shutter for opening and closing the opening, and an uneven surface region is formed on at least either one of a front surface and a back surface of the housing, the uneven surface region enabling the one surface, on which the uneven surface region is formed, to be discriminated from the other surface of the housing.

The third magnetic disk cartridge in accordance with the present invention may be modified such that the uneven surface region is formed by performing matting processing on the one surface of the housing.

Alternatively, the third magnetic disk cartridge in accordance with the present invention may be modified such that the uneven surface region is formed by attaching a label to a certain area of the one surface of the housing.

The present invention still further provides a fourth magnetic disk cartridge capable of being loaded into a disk drive, the magnetic disk cartridge comprising:

i) a housing, and ii) a magnetic disk, which is accommodated for rotation within the housing, wherein an emetic agent layer, which contains an emetic agent as a major constituent, is formed on at least a certain area of a surface of the housing.

In the fourth magnetic disk cartridge in accordance with the present invention, the emetic agent layer may be formed only on the certain area of the surface of the housing. Alternatively, the emetic agent layer may be formed on the entire area of the surface of the housing. Also, a protective layer, which partially covers the emetic agent layer, may be formed on the emetic agent layer.

The present invention also provides a fifth magnetic disk cartridge capable of being loaded into a disk drive, the magnetic disk cartridge comprising:

i) a housing, and ii) a magnetic disk, which is accommodated for rotation rotation within the housing, wherein means for amplifying a feeling of a foreign body, which feeling is given when the magnetic disk cartridge is taken into a mouth, is formed on at least a certain area of a surface of the housing.

The fifth magnetic disk cartridge in accordance with the present invention may be modified such that an emetic agent layer, which contains an emetic agent as a major constituent, is formed on at least a certain area of a surface of the housing.

In the fifth magnetic disk cartridge in accordance with the present invention, the means for amplifying a feeling of a foreign body, which feeling is given when the magnetic disk cartridge is taken into a mouth, may be formed by, for example, performing jagging processing on a side surface of the housing.

With the first magnetic disk cartridge in accordance with the present invention, the housing of the magnetic disk cartridge has the outer peripheral shape composed of the circular arc, which is formed along the contour of the magnetic disk, and the two straight lines, which are circumscribed with the circular arc formed along the contour of the magnetic disk and are normal to each other. Therefore, when the magnetic disk cartridge is to be inserted into the disk drive, the magnetic disk cartridge is capable of being reliably positioned in a predetermined orientation with respect to the disk drive.

The first magnetic disk cartridge in accordance with the present invention may be modified such that the housing is provided with the two side walls, each of which extends along one of the two straight lines that are normal to each other, and the dimension of each of the two side walls of the housing, which dimension is taken in the direction parallel with the axis of rotation of the magnetic disk, is larger than the thickness of the magnetic disk accommodating section of the housing. Also, the first magnetic disk cartridge in accordance with the present invention may be modified such that the top edges of the two side walls of the housing are projected above the top surface of the surface plate section of the housing. Further, the first magnetic disk cartridge in accordance with the present invention may be modified such that the outer surface of each of the two side walls of the housing is slightly projected outwardly from the line circumscribed with the outer circumferential surface of the circumferential wall of the housing, which circumferential wall forms the circular arc formed along the contour of the magnetic disk, the circumscribed line being taken at a position on the outer circumferential surface, which position is adjacent to the outer surface of the side wall of the housing. With the aforesaid modifications of the first magnetic disk cartridge in accordance with the present invention, when the magnetic disk cartridge is merely picked up between the fingers, the front and back surfaces of the magnetic disk cartridge and the correct direction of insertion of the magnetic disk cartridge into the disk drive are capable of being discriminated immediately. Also, in cases where the cartridge receiving slot of the disk drive is formed into a shape corresponding to the projection shapes of the two side walls of the housing, if the magnetic disk cartridge is positioned in an incorrect orientation, the magnetic disk cartridge cannot be inserted into the cartridge receiving slot. In this manner, the magnetic disk cartridge is capable of being more reliably prevented from being inserted in an incorrect orientation into the disk drive.

Further, with the first magnetic disk cartridge in accordance with the present invention, wherein the corner area, which is formed between the two side walls of the housing, is located at the position spaced away from the outer circumference of the magnetic disk, a position adjusting reference hole, which passes vertically through the housing, is capable of being formed at the corner area of the housing. Also, an identification piece, from which information is capable of being read through, for example, reflection of light, transmission of light, or transmission of light having specific wavelengths, is capable of being embedded into the corner area of the housing. In such cases, since the recording capacity of the magnetic disk accommodated in the housing, or the like, is capable of being discriminated by use of the identification piece, the advantages are capable of being obtained in that the housings are capable of being utilized commonly.

Furthermore, the first magnetic disk cartridge in accordance with the present invention may be modified such that the housing is constituted of the lower shell and the upper shell, which is fitted into the side inward from the lower shell and from above, and all of the constituent elements constituting the magnetic disk cartridge are assembled within the lower shell with the laying-up technique. In such cases, the magnetic disk cartridge having the small size is capable of being assembled with a high efficiency.

With the second magnetic disk cartridge in accordance with the present invention, the housing is provided with the urging means, which is located on the trailing side with respect to the direction of insertion of the magnetic disk cartridge into the disk drive, the urging means urging the magnetic disk cartridge toward the discharging direction in the state, in which the magnetic disk cartridge has been inserted into the disk drive and has been set through engagement at the predetermined position within the disk drive. Therefore, in cases where the magnetic disk cartridge has been inserted into the disk drive and has been set through engagement at the predetermined position within the disk drive, the engagement between the magnetic disk cartridge and the disk drive is capable of being prevented from becoming loose.

Also, with the second magnetic disk cartridge in accordance with the present invention, wherein the housing is provided with the urging means for urging the magnetic disk cartridge toward the discharging direction, when the magnetic disk cartridge is released from the engagement with the disk drive, the magnetic disk cartridge is pushed out toward the discharging direction by the urging force of the urging means. Therefore, the releasability of the magnetic disk cartridge from the disk drive is capable of being enhanced, and the magnetic disk cartridge is capable of being easily taken out of the disk drive.

With the second magnetic disk cartridge in accordance with the present invention, wherein the side wall of the housing is provided with the leaf spring region, which constitutes an integral body with the side wall of the housing, and the elastic restoring force of the leaf spring region is utilized, the effects of the second magnetic disk cartridge in accordance with the present invention are capable of being obtained with a simple constitution. Also, in cases where the cartridge receiving slot of the disk drive is formed into a shape corresponding to the projection shape of the side wall of the housing, the magnetic disk cartridge is capable of being prevented from being inserted in an incorrect orientation into the disk drive.

With the third magnetic disk cartridge in accordance with the present invention, the uneven surface region is formed on at least either one of the front surface and the back surface of the housing, the uneven surface region enabling the one surface, on which the uneven surface region is formed, to be discriminated from the other surface of the housing. Therefore, the presence of the uneven surface region is capable of being recognized with the tactile impression. As a result, the front surface and the back surface of the housing are capable of being accurately discriminated from each other. Accordingly, in cases where the magnetic disk cartridge is picked up between the fingers, the entire areas of the front and back surfaces of the magnetic disk cartridge are covered with the fingers, and it is difficult to confirm visually which surface is the front surface or the back surface of the magnetic disk cartridge, it is possible to confirm with the tactile impression which surface is the front surface or the back surface of the magnetic disk cartridge. The problems are thus capable of being prevented from occurring in that the magnetic disk cartridge is inserted into the disk drive in an incorrect orientation with respect to the front and back surfaces of the magnetic disk cartridge.

The selection of which surface of the housing is to be provided with the uneven surface region and the selection of which surface of the housing is to be set so as to stand facing the front surface of the disk drive may be made in accordance with instructions made on the side of the disk drive or on the side of the electronic equipment utilizing the magnetic disk.

With the fourth magnetic disk cartridge in accordance with the present invention, the emetic agent layer, which contains the emetic agent as a major constituent, is formed on at least a certain area of the surface of the housing. Therefore, in cases where, for example, an infant takes the magnetic disk cartridge into the mouth or licks the magnetic disk cartridge by mistake or playfully, the emetic agent contained in the emetic agent layer gives a stimulus to the infant and causes the infant to vomit the magnetic disk cartridge from the mouth unconsciously. Accordingly, the problems are capable of being prevented from occurring in that the infants swallow or bite the magnetic disk cartridge by mistake. Also, since the stimulus of the emetic agent causes the infant to vomit the magnetic disk cartridge immediately, the problems are capable of being prevented from occurring in that the saliva, or the like, adheres to the recording surface of the magnetic disk cartridge, and an error in recording and reproduction of information occurs.

With the fifth magnetic disk cartridge in accordance with the present invention, the means for amplifying a feeling of a foreign body, which feeling is given when the magnetic disk cartridge is taken into a mouth, is formed on at least a certain area of the surface of the housing. Therefore, in cases where, for example, an infant takes the magnetic disk cartridge into the mouth or licks the magnetic disk cartridge by mistake or playfully, the means for amplifying a feeling of a foreign body gives a stimulus to the infant and causes the infant to vomit the magnetic disk cartridge from the mouth unconsciously. Accordingly, the problems are capable of being prevented from occurring in that the infants swallow or bite the magnetic disk cartridge by mistake. Also, since the stimulus of the means for amplifying a feeling of a foreign body causes the infant to vomit the magnetic disk cartridge immediately, the problems are capable of being prevented from occurring in that the saliva, or the like, adheres to the recording surface of the magnetic disk cartridge, and an error in recording and reproduction of information occurs.

The first to fifth magnetic disk cartridges in accordance with the present invention are suitable particularly for use in digital cameras. Also, the magnetic disk cartridges in accordance with the present invention are convenient for processing. Further, since the magnetic disks are utilized, the magnetic disk cartridges in accordance with the present invention are capable of being produced at a low cost. Therefore, the magnetic disk cartridges in accordance with the present invention are capable of being utilized in a manner such that, after information has been recorded on the magnetic disks of the magnetic disk cartridges, the users preserve the magnetic disk cartridges or give the magnetic disk cartridges to other persons.

DESCRIPTION OF THE PREFERRED EMBODIMENTS

The present invention will hereinbelow be described in further detail with reference to the accompanying drawings.

Figure 1:
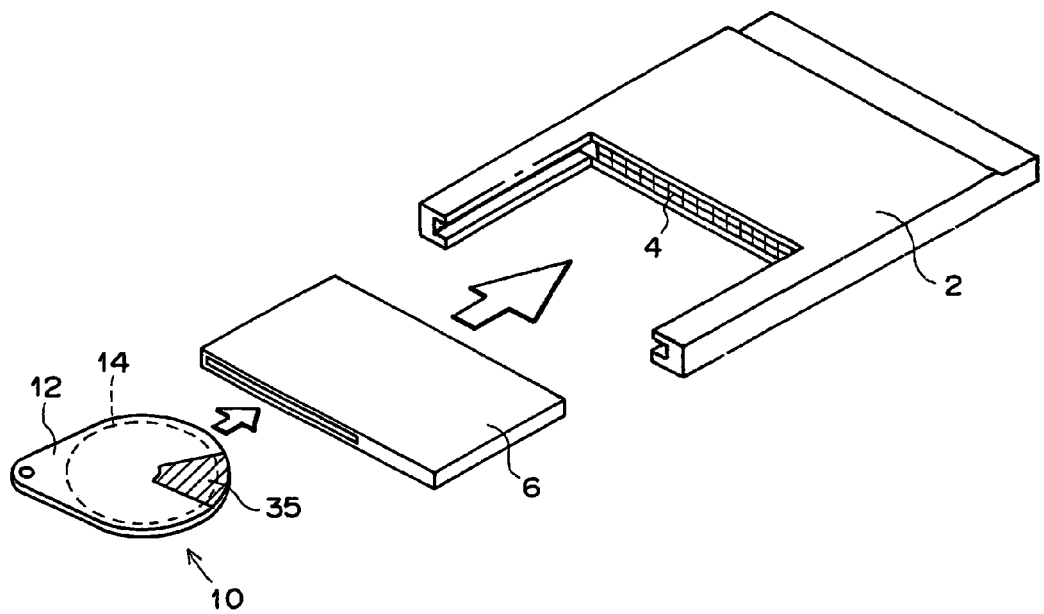
FIG. 1 is a schematic explanatory view showing a first embodiment of the magnetic disk cartridge in accordance with the present invention, a disk drive into which the magnetic disk cartridge is to be inserted, and an electronic equipment provided with a card slot, into which the disk drive is to be loaded.
Figure 14A:
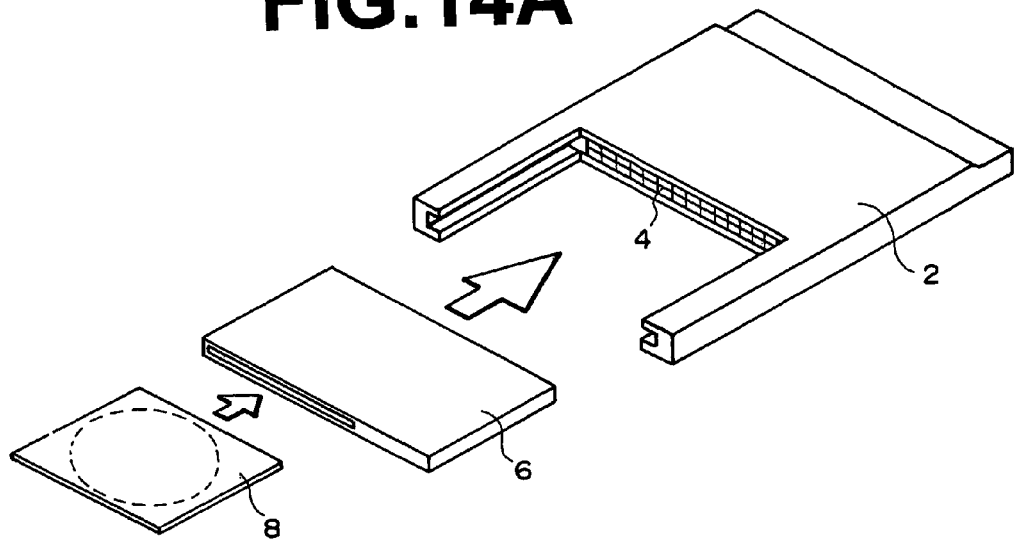
FIG. 14A is a schematic explanatory view showing a conventional magnetic disk cartridge, a disk drive, and an electronic equipment provided with a card slot, into which the disk drive is to be loaded.
Figure 14B:
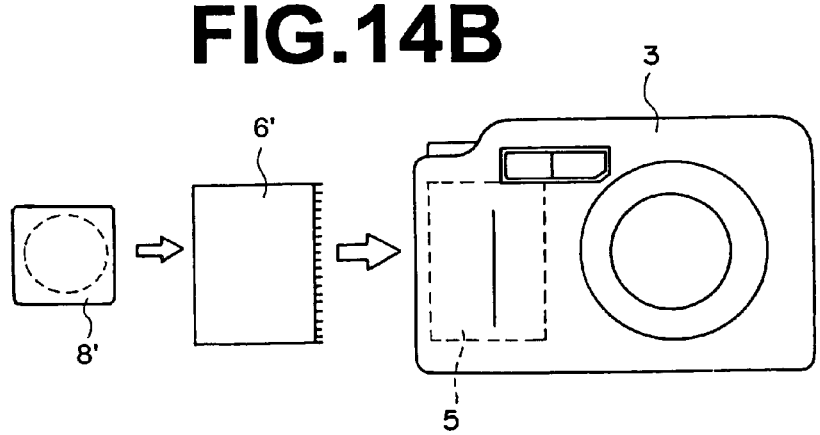
FIG. 14B is a schematic explanatory view showing a conventional magnetic disk cartridge, a disk drive, and a digital camera provided with a socket, into which the disk drive is to be loaded.

FIG. 1 shows the PC card 2, which is of the same type as the PC card 2 shown in FIG. 14A and is to be inserted into the PC card receiving slot of the personal computer, the disk drive 6, which is to be loaded to and electrically connected to the socket 4 of the receiving section of the PC card 2, and a magnetic disk cartridge 10, which is a first embodiment of the magnetic disk cartridge in accordance with the present invention and is to be inserted into the disk drive 6. The magnetic disk cartridge 10 comprises a flat housing 12 and a flexible circular disk-shaped magnetic disk 14, which is accommodated for rotation within the housing 12. The magnetic disk 14 should preferably be a high-recording-density magnetic recording medium utilizing barium ferrite particles. The housing 12 is provided with an upper shutter 35 and a lower shutter 25 capable of being rotated for opening and closing the openings, which allow magnetic heads of the disk drive 6 to access the surfaces of the magnetic disk 14. (In FIG. 1, only the upper shutter 35 is shown.) Also, the housing 12 has a planar shape constituted of an outer peripheral shape composed of a circular arc, which is formed along a contour of the magnetic disk 14, and two straight lines, which are circumscribed with the circular arc formed along the contour of the magnetic disk 14 and are normal to each other.

Figure 2:
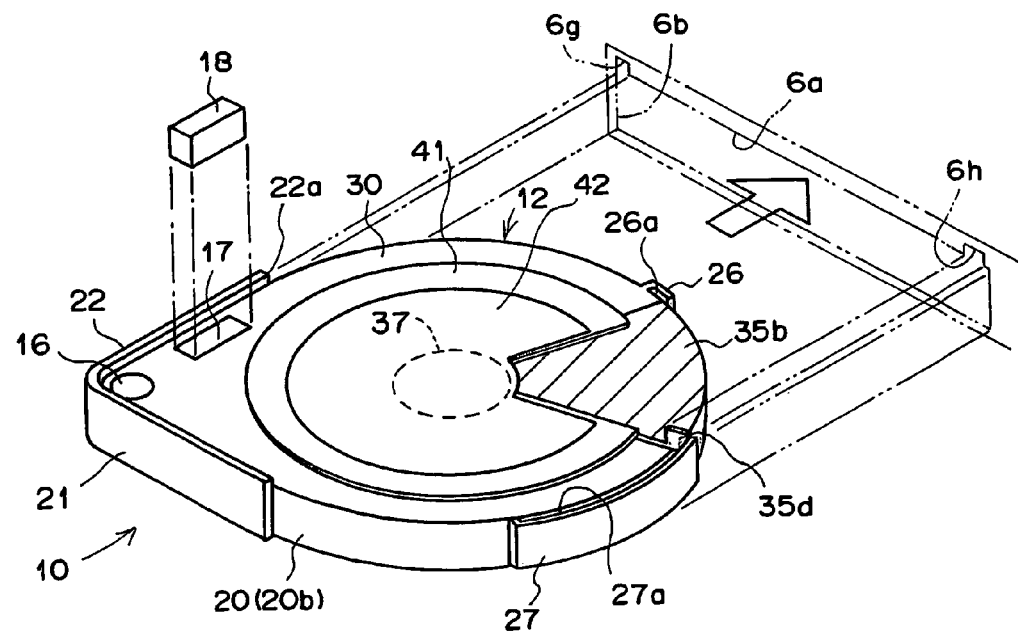
FIG. 2 is a perspective view showing the first embodiment of the magnetic disk cartridge in accordance with the present invention, the view being taken from above.
Figure 3:
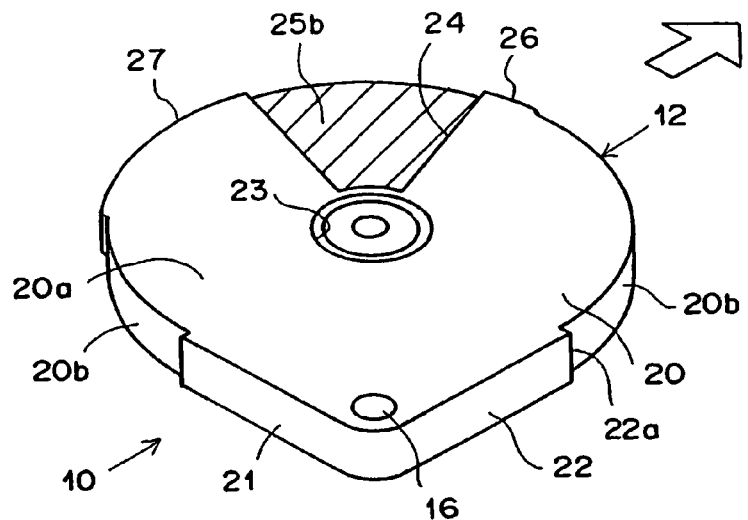
FIG. 3 is a perspective view showing the magnetic disk cartridge of FIG. 2, the view being taken from below.
Figure 4:
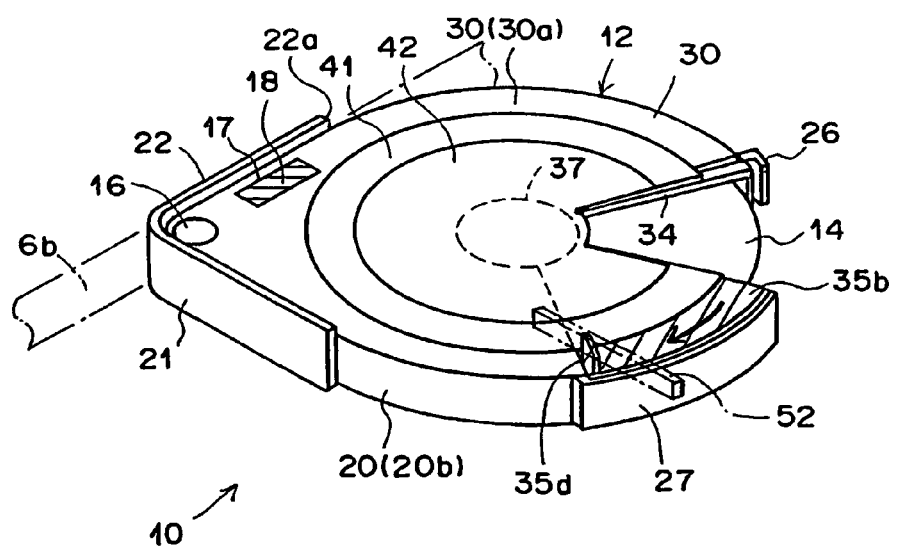
FIG. 4 is a perspective view, corresponding to FIG. 2, showing the magnetic disk cartridge of FIG. 2 in a state in which shutters have been opened.
Figure 5:
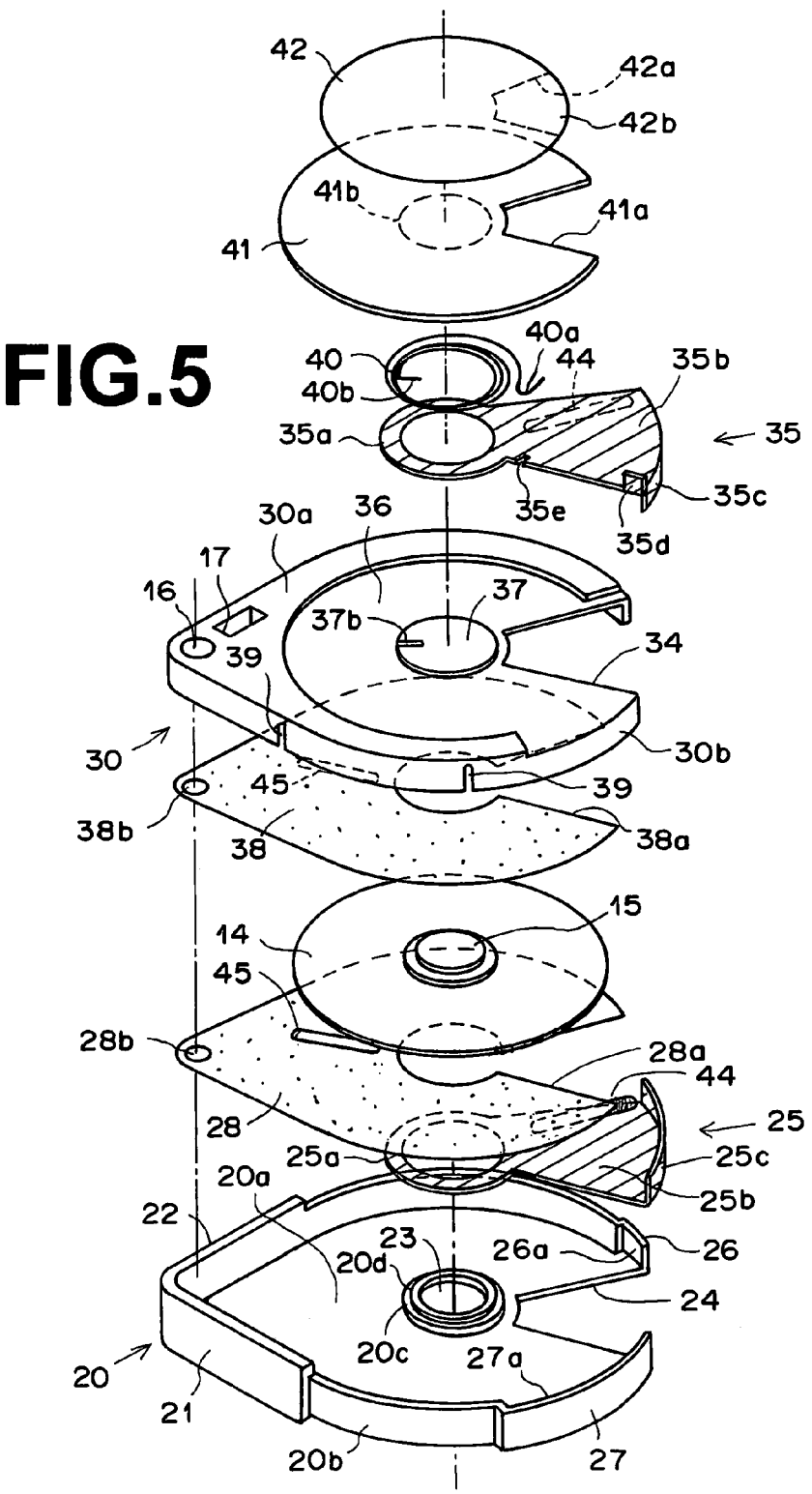
FIG. 5 is an exploded perspective view showing the magnetic disk cartridge of FIG. 2.

The constitution of the magnetic disk cartridge 10, which is schematically shown in FIG. 1, is illustrated in detail in FIG. 2, FIG. 3, FIG. 4, and FIG. 5. FIG. 2 is a perspective view showing the magnetic disk cartridge 10 and part of the disk drive 6, into which the magnetic disk cartridge 10 is inserted, the view being taken from above. FIG. 3 is a perspective view showing the magnetic disk cartridge 10, the view being taken from below. FIG. 4 is a perspective view, corresponding to FIG. 2, showing the magnetic disk cartridge 10 in a state in which the upper shutter 35 and the lower shutter 25 have been opened. FIG. 5 is an exploded perspective view showing the magnetic disk cartridge 10.

The housing 12 of the magnetic disk cartridge 10 comprises a lower shell 20, which is made from a metal, and an upper shell 30, which is made from a metal and is fitted into the side inward from the lower shell 20 and from above. As illustrated in FIG. 5, the lower shutter 25, which is made from a metal and acts on the side of the lower shell 20, is located on the side inward from the lower shell 20. Also, the upper shutter 35, which is made from a metal and acts on the side of the upper shell 30, is located on the side outward from the upper shell 30. Further, all of the constituent elements constituting the magnetic disk cartridge 10 are assembled within the lower shell 20 with a laying-up technique.

As will be clear from FIG. 5, the lower shell 20 is provided with a bottom plate 20a, which defines the contour of the planar shape of the housing 12, and side walls rising upwardly from the outer periphery of the bottom plate 20a, except for the region of an opening 24, which will be described later. Of the side walls of the lower shell 20, side walls 21 and 22 continuing into each other rise upwardly from straight-line outer peripheral edges of the bottom plate 20a, the straight-line outer peripheral edges constituting a corner of the bottom plate 20a and extending along the two straight lines, which are circumscribed with the circular arc formed along the contour of the magnetic disk 14 and are normal to each other. The top edges of the side walls 21 and 22 of the lower shell 20 are projected above the top surface of the upper shell 30. Also, the bottom edges of the side walls 21 and 22 of the lower shell 20 are in the same plane as the bottom surface of the lower shell 20. Further, the outer surface of each of the side walls 21 and 22 of the lower shell 20 is slightly projected outwardly from a line circumscribed with the outer circumferential surface of a side wall (i.e., a circular arc-shaped circumferential wall) 20b of the lower shell 20, which circumferential wall forms the circular arc formed along the contour of the magnetic disk 14, the circumscribed line being taken at a position on the outer circumferential surface, which position is adjacent to the outer surface of each of the side walls 21 and 22 of the lower shell 20. In this manner, the side walls 21 and 22 of the lower shell 20 constitute erroneous insertion preventing walls.

Also, as illustrated in FIG. 2, the side wall 21 is formed at the end area of the lower shell 20 on a trailing side with respect to a direction of insertion of the magnetic disk cartridge 10 into the disk drive 6 so as to extend in a direction, which is normal to the direction of insertion of the magnetic disk cartridge 10 into the disk drive 6. The other side wall 22 extends in parallel with the direction of insertion of the magnetic disk cartridge 10 into the disk drive 6. The end area of the side wall 22 on a leading side with respect to the direction of insertion of the magnetic disk cartridge 10 into the disk drive 6 constitutes an inserting position adjusting step-like area 22a, which adjusts the position of insertion of the magnetic disk cartridge 10 with respect to the disk drive 6. Further, the corner area of the housing 12, which corner area is defined by the side walls 21 and 22, is provided with a hole 16, which passes through the upper shell 30 and the lower shell 20 in a direction approximately parallel with an axis of rotation of the magnetic disk 14. The hole 16, which is formed on the side of the lower shell 20, acts as a position adjusting reference hole.

As illustrated in FIG. 5, a center core 15 is secured to a center area of the magnetic disk 14. Also, a center hole 23 is formed at a center area of the bottom plate 20a of the lower shell 20. The center hole 23 of the bottom plate 20a of the lower shell 20 exposes a bottom surface of the center core 15 to the exterior. An annular wall 20c is formed around the center hole 23 of the bottom plate 20a of the lower shell 20, such that the annular wall 20c is coaxial with the center hole 23 and projects from the upper surface of the bottom plate 20a. The annular wall 20c supports an annular region 25a of the lower shutter 25, which annular region will be described later, such that the lower shutter 25 is capable of being rotated. Also, the annular wall 20c is provided with a flat top surface. An annular wall 20d, which has a diameter smaller than the diameter of the annular wall 20c, is formed on the flat top surface of the annular wall 20c, such that the annular wall 20d is coaxial with the annular wall 20c. The annular wall 20d supports a center area of a lower slide sheet 28, which will be described later. The annular wall 20c and the annular wall 20d are capable of being formed by performing drawing processing on the bottom plate 20a. Further, an annular wall (not shown) is formed with the drawing processing around the position adjusting reference hole 16, which is formed at the corner area of the bottom plate 20a of the lower shell 20.

Further, the lower shell 20 is provided with the sectorial opening 24, which is formed on the side opposite to the position adjusting reference hole 16 with respect to the center hole 23. The opening 24 is formed over a predetermined angle range around the center hole 23. The opening 24 allows the magnetic head of the disk drive 6, which magnetic head will be described later, to access the surface of the magnetic disk 14. The lower shutter 25, which is capable of being rotated in order to open and close the opening 24, is located on the side inward from the lower shell 20.

The lower shutter 25 comprises the annular region 25a, which is formed at the center area corresponding to the center area of the bottom plate 20a of the lower shell 20 and is supported for rotation by the annular wall 20c of the lower shell 20. The lower shutter 25 also comprises a sectorial main plate region 25b, which extends radially from the annular region 25a over an angle range wider than the opening 24 of the lower shell 20. The lower shutter 25 further comprises a vertical plate region 25c, which is bent upwardly approximately at a right angle along the circular arc-shaped outer periphery of the sectorial main plate region 25b.

The upper shell 30 comprises a top plate 30a, which has a shape approximately similar to the shape of the bottom plate 20a of the lower shell 20 and is slightly smaller than the bottom plate 20a. The upper shell 30 also comprises a circular arc-shaped circumferential wall 30b extending downwardly from the outer periphery of the top plate 30a, except for the region of an opening 34, which will be described later. The circular arc-shaped circumferential wall 30b of the upper shell 30 is elastically fitted to the side inward from the circular arc-shaped circumferential wall 20b of the lower shell 20. The upper shell 30 is provided with the opening 34, which is formed at the position coinciding with the position of the opening 24 of the lower shell 20. The opening 34 of the upper shell 30 allows the magnetic head of the disk drive 6 to access the surface of the magnetic disk 14. Also, the upper shutter 35 for opening and closing the opening 34 of the upper shell 30 is located on the side outward from the upper shell 30.

Furthermore, a hole 17 is formed at the corner area of the upper shell 30, whose outer periphery is defined by the two straight lines normal to each other. The hole 17 is located at a position adjacent to the hole 16 of the upper shell 30, which hole is located at the position coinciding with the position of the position adjusting reference hole 16 of the lower shell 20. An identification piece 18, from which information is capable of being read through, for example, reflection of light, transmission of light, or transmission of light having specific wavelengths, is capable of being embedded later into the hole 17. An annular wall (not shown) is formed with the drawing processing on a bottom surface of the upper shell 30 and around the hole 16 of the upper shell 30.

The upper shutter 35 has a shape approximately similar to the shape of the lower shutter 25. The upper shutter 35 comprises an annular region 35a, which is formed at the center area. The upper shutter 35 also comprises a sectorial main plate region 35b, which extends radially from the annular region 35a. The upper shutter 35 further comprises a vertical plate region 35c, which is bent downwardly approximately at a right angle along the circular arc-shaped outer periphery of the main plate region 35b. The upper shutter 35 still further comprises an actuating projection piece 35d, which is raised upwardly from an outer end area of the sectorial main plate region 35b on the leading side with respect to the shutter opening direction in order to actuate the opening movements of the lower shutter 25 and the upper shutter 35.

The height of a top edge of the actuating projection piece 35d is set such that, after the magnetic disk cartridge 10 has been assembled, the height of the top edge of the actuating projection piece 35d approximately coincide with the heights of the top edges of the side walls 21 and 22, which are formed at the corner of the housing 12. In this manner, the problems are capable of being prevented from occurring in that, when a plurality of magnetic disk cartridges 10, 10, . . . are laid up in horizontal orientations, the plurality of the laid-up magnetic disk cartridges 10, 10, . . . incline.

As will be described later, the vertical plate region 25c of the lower shutter 25 and the vertical plate region 35c of the upper shutter 35 are coupled with each other at the time of the assembling. In order to accommodate the vertical plate region 25c and the vertical plate region 35c such that the vertical plate region 25c and the vertical plate region 35c are capable of being rotated, circumferential walls 26 and 27 are formed on both sides of the opening 24 of the lower shell 20. The circumferential walls 26 and 27 of the lower shell 20 are projected radially outwardly over the range of rotation of the lower shutter 25 and the upper shutter 35. A recess 26a is formed on the side inward from the circumferential wall 26. Also, a recess 27a is formed on the side inward from the circumferential wall 27. In FIG. 2, the recess 26a and the recess 27a appear as circular arc-shaped grooves.

Also, as illustrated in FIG. 5, a depressed region 36 is formed on the upper surface of the top plate 30a of the upper shell 30. The depressed region 36 accommodates the annular region 35a and the sectorial main plate region 35b of the upper shutter 35 and allows the upper shutter 35 to rotate. A circular protruding region 37 is formed at a center area of the depressed region 36. The circular protruding region 37 supports the annular region 35a of the upper shutter 35 such that the annular region 35a is capable of being rotated around the circular protruding region 37. In cases where the annular region 35a of the upper shutter 35 has been supported by the circular protruding region 37 of the upper shell 30, the sectorial main plate region 35b of the upper shutter 35 comes into contact with the bottom surface of the depressed region 36, and the vertical plate region 35c of the upper shutter 35 covers the side outward from the circular arc-shaped circumferential wall 30b, which extends on both sides of the opening 34 of the upper shell 30. Further, engagement sections are formed at the top edge of the vertical plate region 25c of the lower shutter 25 and the bottom edge of the vertical plate region 35c of the upper shutter 35. The engagement section of the top edge of the vertical plate region 25c of the lower shutter 25 and the engagement section of the bottom edge of the vertical plate region 35c of the upper shutter 35 engage with each other when, after the upper shell 30 has been fitted into the lower shell 20, the upper shutter 35 is placed on the upper shell 30 and pushed from above. By the engagement of the engagement sections with each other, the upper shutter 35 and the lower shutter 25 are combined into an integral body.

The magnetic disk cartridge 10 has the feature in that all of the constituent parts constituting the magnetic disk cartridge 10 are capable of being assembled on the lower shell 20 with the laying-up technique. How the magnetic disk cartridge 10 is assembled will be described hereinbelow with reference to FIG. 5 together with constituent parts other than the constituent parts described above.

Firstly, the annular region 25a of the lower shutter 25 is fitted onto the annular wall 20c of the bottom plate 20a of the lower shell 20. In this case, the lower shutter 25 is located at the closing position, at which the sectorial main plate region 25b closes the opening 24 of the lower shell 20, such that the vertical plate region 25c of the lower shutter 25 are in contact with the inner wall surfaces of the recess 26a and the recess 27a formed on both sides of the opening 24. Thereafter, the lower slide sheet 28 is placed on the lower shutter 25. The lower slide sheet 28 has a shape approximately similar to the shape of the bottom plate 20a of the lower shell 20. The lower slide sheet 28 is provided with a sectorial opening 28a, which extends outwardly from a center hole, and a corner area, which is defined by two straight lines normal to each other. The center hole of the lower slide sheet 28 is fitted onto the annular wall 20d of the bottom plate 20a of the lower shell 20, and the lower slide sheet 28 is supported on the flat top surface of the annular wall 20c, which is lower than the annular wall 20d. The lower slide sheet 28 is provided with a hole 28b, which is formed at the corner area of the lower slide sheet 28. The hole 28b is formed at the position coinciding with the position of the position adjusting reference hole 16 of the bottom plate 20a of the lower shell 20. The hole 28b of the lower slide sheet 28 is fitted onto the annular wall, which has been formed around the position adjusting reference hole 16 of the lower shell 20. In this manner, the corner area of the lower slide sheet 28 is supported by the annular wall formed around the position adjusting reference hole 16 of the lower shell 20.

Thereafter, the magnetic disk 14 provided with the center core 15 is placed on the lower slide sheet 28, and an upper slide sheet 38 is placed on the magnetic disk 14. The upper slide sheet 38 is provided with a sectorial opening 38a and a hole 38b, which is formed at the corner area of the upper slide sheet 38. The upper slide sheet 38 has a shape identical with the shape of the lower slide sheet 28. The circular arc-shaped circumferential wall 30b of the upper shell 30 is then fitted to the side inward from the circular arc-shaped circumferential wall 20b of the lower shell 20. As a result, the vertical plate region 25c of the lower shutter 25, which has been located at the recess 26a and the recess 27a of the lower shell 20, is capable of being moved within and along a groove, which is formed between the recesses 26a, 27a of the lower shell 20 and the circular arc-shaped circumferential wall 30b of the upper shell 30. Further, the annular wall of the hole 16, which is formed at the corner area of the top plate 30a of the upper shell 30, is fitted into the hole 38b formed at the corner area of the upper slide sheet 38, and the corner area of the upper slide sheet 38 is thus supported by the annular wall of the hole 16 formed at the corner area of the top plate 30a of the upper shell 30. The corner area of the lower slide sheet 28 and the corner area of the upper slide sheet 38 are also supported by the inner wall surfaces of the side walls formed at the corner area of the upper shell 30.

The upper shutter 35 is then set on the upper shell 30, such that the annular region 35a of the upper shutter 35 is supported by the circular protruding region 37, which is formed on the upper surface of the upper shell 30. Also, the vertical plate region 35c of the upper shutter 35 is combined with the vertical plate region 25c of the lower shutter 25, and the lower shutter 25 and the upper shutter 35 are thus combined into the integral body. Thereafter, a planar spiral spring 40 for urging the lower shutter 25 and the upper shutter 35 is fitted onto the circular protruding region 37 of the upper shell 30. An inner end portion 40b of the spiral spring 40 is engaged with a slit 37b of the circular protruding region 37. Also, an outer end portion 40a of the spiral spring 40 is engaged with a notch 35e of the sectorial main plate region 35b of the upper shutter 35. In this manner, the lower shutter 25 and the upper shutter 35 are urged by the spiral spring 40 toward the closing direction and are kept at the closing position.

Thereafter, a cover plate 41 made from a metal is set on the upper shutter 35. The cover plate 41 is provided with an opening 41a, which has a shape in accordance with the shape of the opening 34 of the upper shell 30 and has a diameter larger than the diameter of the depressed region 36 of the upper shell 30. Specifically, the center area of the cover plate 41, which is indicated by the broken line 41b in FIG. 5, is adhered with an adhesive agent to the circular protruding region 37 of the upper shell 30. Also, the outer peripheral area of the cover plate 41 is adhered with an adhesive agent to the top plate 30a of the upper shell 30. In this manner, the spiral spring 40 is prevented from being disengaged from the slit 37b of the circular protruding region 37 and the notch 35e of the upper shutter 35. Further, a space for allowing the rotation of the upper shutter 35 is defined on the side of the bottom surface of the cover plate 41. At this stage, the operations for assembling the magnetic disk cartridge 10 are finished.

In cases where an uneven surface region is formed on the top surface of the cover plate 41, the front surface and the back surface of the magnetic disk cartridge 10 are capable of being discriminated from each other with a tactile impression. By way of example, the uneven surface region is capable of being formed by performing matting processing on the top surface of the cover plate 41. In such cases, numerals, and the like, are capable of being written on the matting-processed region by use of a pencil. Alternatively, as illustrated in FIG. 5, a circular label 42 made from paper, or the like, may be attached to a certain area of the top surface of the cover plate 41, and the uneven surface region may thereby be formed. In such cases, information is capable of being written on the circular label 42. Further, the circular label 42 may be provided with perforations 42a along the contour of the opening 41a of the cover plate 41, such that a region 42b surrounded by the perforations 42a may be cut out when the magnetic disk cartridge 10 is to be used. In such cases, with the region 42b before being cut out from the circular label 42, it is capable of being guaranteed that the magnetic disk cartridge 10 is a virgin magnetic disk cartridge, and the upper shutter 35 is capable of being protected. As another alternative, a fluorescent coating material may be applied onto the top surface of the cover plate 41, such that the front surface and the back surface of the magnetic disk cartridge 10 are capable of being discriminated from each other in darkness.

In order for the circular arc-shaped circumferential wall 30b of the upper shell 30 and the circular arc-shaped circumferential wall 20b of the lower shell 20 to be elastically fitted to each other, either one of the circular arc-shaped circumferential wall 30b and the circular arc-shaped circumferential wall 20b should preferably be provided with a plurality of slits. For example, as illustrated in FIG. 5, the circular arc-shaped circumferential wall 30b of the upper shell 30 should preferably be provided with a plurality of slits 39, 39, . . . In such cases, elasticity is capable of being imparted to the circular arc-shaped circumferential wall 30b.

Also, cleaning members 44, 44 are secured respectively to the top surface of the sectorial main plate region 25b of the lower shutter 25 and the bottom surface of the sectorial main plate region 35b of the upper shutter 35, such that the cleaning members 44, 44 extend in the radial direction. The cleaning members 44, 44 come into contact with the surfaces of the magnetic disk 14, which is being rotated, via the opening 34 of the upper shell 30, the sectorial opening 28a of the lower slide sheet 28, and the sectorial opening 38a of the upper slide sheet 38. The cleaning members 44, 44 are secured radially along radial edges, with respect to the closing direction, of the sectorial main plate region 25b of the lower shutter 25 and the sectorial main plate region 35b of the upper shutter 35. The cleaning members 44, 44 also act to prevent the magnetic disk 14 from coming into contact with the sectorial main plate region 25b of the lower shutter 25 and the sectorial main plate region 35b of the upper shutter 35, while the magnetic disk 14 is being stationary.

Further, in cases where each of the cleaning members 44, 44 is in contact with only one site of one of the surfaces of the 14 when the lower shutter 25 and the upper shutter 35 have been opened and the magnetic disk 14 is rotating, the balance of the magnetic disk 14 during the rotation will not be kept good. Therefore, the surface of the lower slide sheet 28 for protecting the magnetic disk 14, which surface stands facing the magnetic disk 14, should preferably be provided with a protruding strip 45, which has a height equal to the height of the cleaning member 44. Also, the surface of the upper slide sheet 38 for protecting the magnetic disk 14, which surface stands facing the magnetic disk 14, should preferably be provided with a protruding strip 45, which has a height equal to the height of the cleaning member 44. In such cases, each of the protruding strip 45 of the lower slide sheet 28 and the protruding strip 45 of the upper slide sheet 38 is located radially at a position deviated by an angle of 180 degrees with respect to the position of the cleaning member 44, at which the cleaning member 44 is located when the lower shutter 25 and the upper shutter 35 have been opened. Alternatively, each of the protruding strip 45 of the lower slide sheet 28 and the protruding strip 45 of the upper slide sheet 38 may be located radially at a position deviated by an angle of 120 degrees with respect to the position of the cleaning member 44, at which the cleaning member 44 is located when the lower shutter 25 and the upper shutter 35 have been opened.

Figure 6:
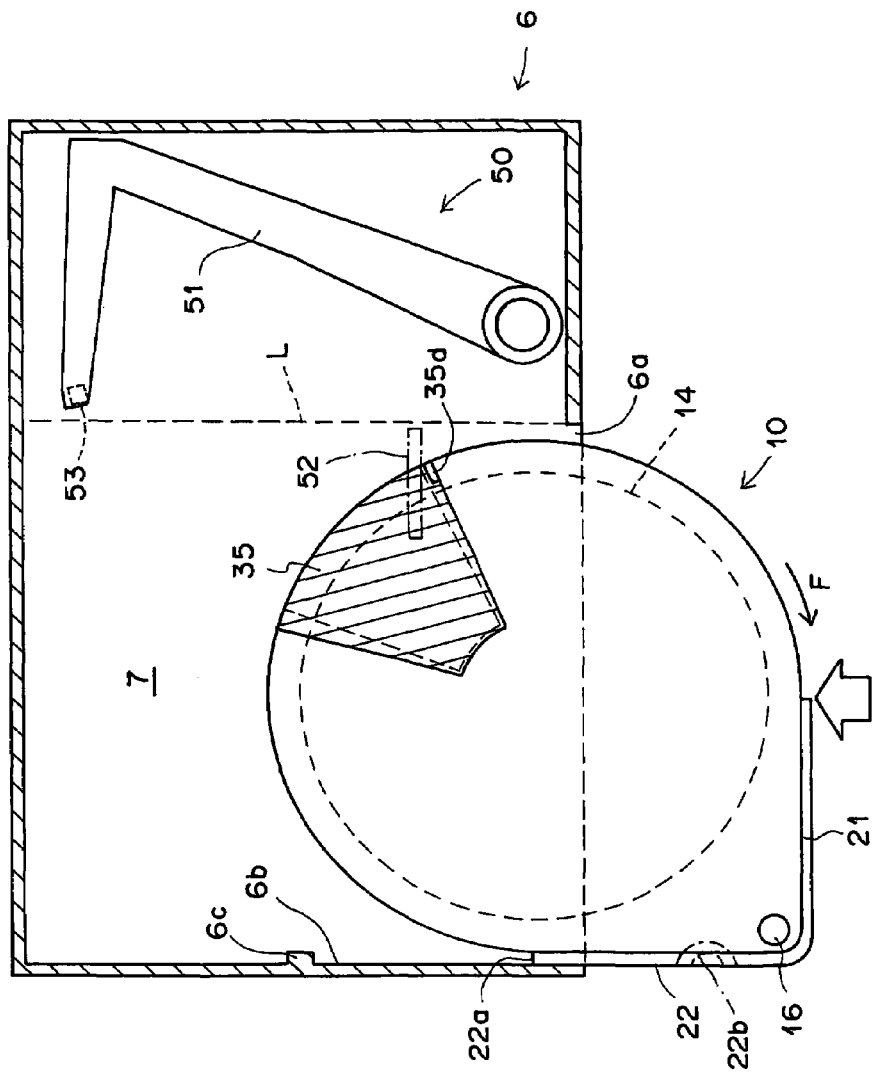
FIG. 6 is a schematic plan view showing the magnetic disk cartridge of FIG. 2 in a state in which the magnetic disk cartridge is being inserted into a disk drive.
Figure 7:
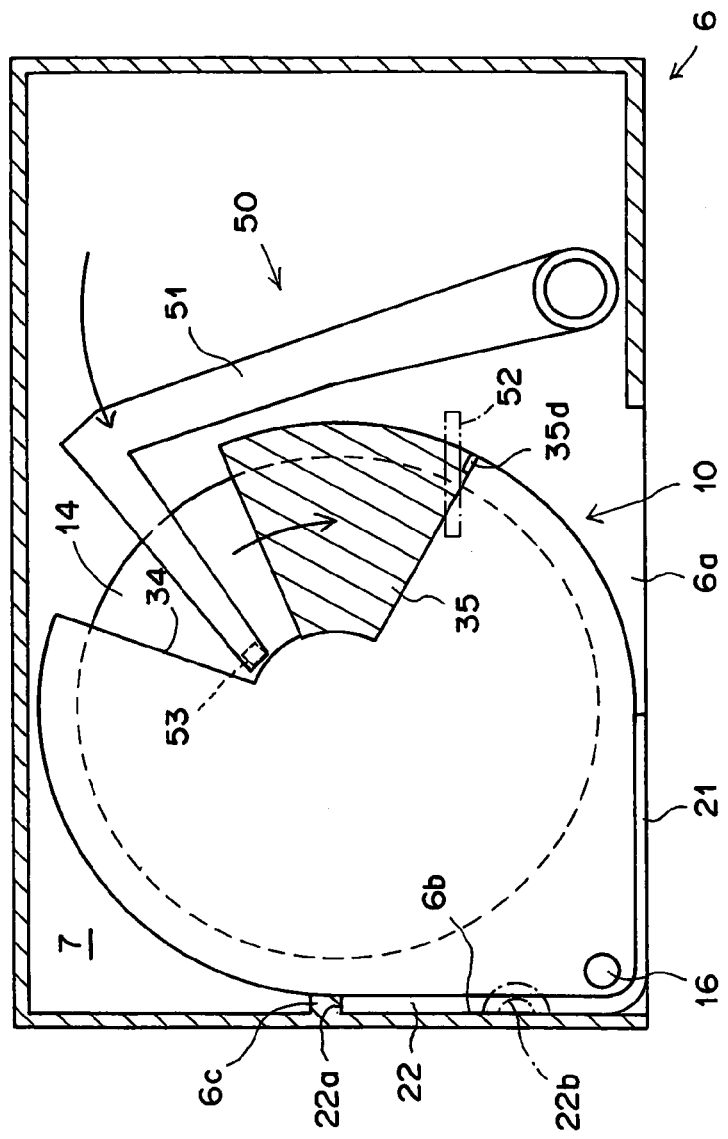
FIG. 7 is a schematic plan view showing the magnetic disk cartridge of FIG. 2 in a state in which the magnetic disk cartridge has been loaded into the disk drive.

FIG. 6 is a schematic plan view showing the magnetic disk cartridge 10 in a state in which the magnetic disk cartridge 10 is being inserted into the disk drive 6. FIG. 7 is a schematic plan view showing the magnetic disk cartridge 10 in a state in which the magnetic disk cartridge 10 has been loaded into the disk drive 6. FIG. 6 and FIG. 7 act as an aid in explaining the relationship between the position of the magnetic disk cartridge 10 and the position of the disk drive 6. Therefore, in FIG. 6 and FIG. 7, constitutions of the magnetic disk cartridge 10 and the disk drive 6 are not illustrated in detail.

The disk drive 6 comprises a cartridge receiving slot 6a and a cartridge accommodating space 7, which is formed within the disk drive 6. The disk drive 6 also comprises a head assembly 50 provided with a pair of upper and lower rotating arms 51, 51. (In the plan view of FIG. 6, only the upper rotating arm 51 is shown.) The upper and lower rotating arms 51, 51 are ordinarily retreated to the position outward from the insertion path for the magnetic disk cartridge 10. (In FIG. 6, a boundary line of the insertion path for the magnetic disk cartridge 10 is indicated by the broken line L.) The disk drive 6 further comprises a shutter actuating member 52. When the magnetic disk cartridge 10 is being inserted into the disk drive 6, the shutter actuating member 52 engages with the actuating projection piece 35d of the upper shutter 35 and opens the lower shutter 25 and the upper shutter 35. Each of magnetic heads 53, 53 is secured to one of end areas of the upper and lower rotating arms 51, 51, such that the magnetic heads 53, 53 secured to the end areas of the upper and lower rotating arms 51, 51 stand facing each other and access to both surfaces of the magnetic disk 14.

Also, the cartridge receiving slot 6a extends from the boundary line L of the insertion path for the magnetic disk cartridge 10 to an inner side wall surface 6b of the disk drive 6, which inner side wall surface is located on the side opposite to the side of the head assembly 50. The inner side wall surface 6b is provided with a position adjusting projection 6c for engaging with the inserting position adjusting step-like area 22a of the side wall 22 of the magnetic disk cartridge 10. Further, as illustrated in FIG. 2, notches 6g and 6h are formed in the wall of the disk drive 6, which wall extends along the top edge of the cartridge receiving slot 6a. The notch 6g is formed at the position corresponding to the position of the top edge region of the side wall 22 of the magnetic disk cartridge 10 in order to allow the passage of the top edge region of the side wall 22 of the magnetic disk cartridge 10. The notch 6h is formed at the position corresponding to the position of the actuating projection piece 35d of the upper shutter 35, which is located at the closed position, in order to allow the passage of the actuating projection piece 35d of the upper shutter 35. The notches 6g and 6h also act to prevent the magnetic disk cartridge 10 from being inserted in an incorrect orientation into the disk drive 6.

The magnetic disk cartridge 10 is inserted into the disk drive 6 from the direction indicated by the arrow in FIG. 6. When the magnetic disk cartridge 10 is being inserted into the disk drive 6, the actuating projection piece 35d of the upper shutter 35 comes into engagement with the shutter actuating member 52 of the disk drive 6, and the lower shutter 25 and the upper shutter 35 are opened. The actuating projection piece 35d of the upper shutter 35 is located on the right-hand side with respect to the direction of insertion of the magnetic disk cartridge 10 into the disk drive 6. Therefore, in such cases, as the magnetic disk cartridge 10 is inserted into the disk drive 6, force F, which causes the magnetic disk cartridge 10 to rotate clockwise in FIG. 6, is applied by the shutter actuating member 52 to the magnetic disk cartridge 10. However, the side wall 22 extending in a straight line at the corner area of the housing 12 of the magnetic disk cartridge 10 comes into contact with the inner side wall surface 6b, and the magnetic disk cartridge 10 is thus prevented from rotating clockwise in FIG. 6.

Further, as illustrated in FIG. 7, when the magnetic disk cartridge 10 has been completely inserted into the disk drive 6, a position adjusting projection (not shown) of the disk drive 6 engages into the position adjusting reference hole 16 of the magnetic disk cartridge 10. Furthermore, when necessary, a position adjusting projection (not shown) of the disk drive 6 engages into a position adjusting recess 22b, which is formed in the side wall of the housing 12. In this manner, the magnetic disk cartridge 10 is set through engagement at the predetermined position within the disk drive 6. Also, the upper and lower rotating arms 51, 51 of the head assembly 50 are rotated counter-clockwise in FIG. 7, and the magnetic heads 53, 53 thus access the surfaces of the magnetic disk 14.

As clear from the foregoing, with this embodiment of the magnetic disk cartridge 10, the housing 12 has the planar shape constituted of the outer peripheral shape composed of the circular arc, which is formed along the contour of the magnetic disk 14, and the two straight lines, which are circumscribed with the circular arc formed along the contour of the magnetic disk 14 and are normal to each other. Therefore, when the magnetic disk cartridge 10 is inserted into the disk drive 6, the magnetic disk cartridge 10 is capable of being reliably positioned in the predetermined orientation with respect to the disk drive 6.

In particular, with this embodiment of the magnetic disk cartridge 10, the outer surface of each of the side walls 21 and 22 of the lower shell 20, which side walls extend in straight lines along the aforesaid two circumscribed lines of the housing 12 normal to each other, is slightly projected outwardly from the line circumscribed with the outer circumferential surface of the circular arc-shaped circumferential wall 20b of the lower shell 20, which circumferential wall forms the circular arc formed along the contour of the magnetic disk 14, the circumscribed line being taken at the position on the outer circumferential surface, which position is adjacent to the outer surface of each of the side walls 21 and 22 of the lower shell 20. Also, the top edges of the side walls 21 and 22 of the lower shell 20 are projected above the top surface of the surface plate section of the housing 12. Therefore, when the magnetic disk cartridge 10 is merely picked up between the fingers, the front and back surfaces of the magnetic disk cartridge 10 and the correct direction of insertion of the magnetic disk cartridge 10 into the disk drive 6 are capable of being discriminated immediately.

Specifically, the side wall 21 is formed at the end area of the lower shell 20 on the trailing side with respect to the direction of insertion of the magnetic disk cartridge 10 into the disk drive 6. Therefore, the anterior-posterior orientation of the magnetic disk cartridge 10 is capable of being discriminated easily. Also, the top edges of the side walls 21 and 22 of the lower shell 20 are projected above the top surface of the surface plate section of the housing 12, and the bottom edges of the side walls 21 and 22 of the lower shell 20 are in the same plane as the bottom surface of the lower shell 20. Therefore, the orientation of the magnetic disk cartridge 10 with respect to the front and back surface sides is capable of being discriminated easily.

Also, as illustrated in FIG. 2, the notches 6g and 6h are formed in the wall of the disk drive 6, which wall extends along the top edge of the cartridge receiving slot 6a. Therefore, in cases where the magnetic disk cartridge 10 is inserted in an approximately correct orientation with respect to the anterior and posterior sides and in an approximately correct orientation with respect to the front and back surfaces, but in an incorrect orientation slightly rotated along the direction of rotation of the magnetic disk 14, into the disk drive 6, the top edge region of the side wall 22 and the actuating projection piece 35d of the upper shutter 35 cannot pass respectively through the notches 6g and 6h. As a result, the magnetic disk cartridge 10 is capable of being prevented from being inserted in an incorrect orientation into the disk drive 6.

Further, with this embodiment of the magnetic disk cartridge 10, the uneven surface region is formed on at least either one of the front surface and the back surface of the housing 12, the uneven surface region enabling the one surface, on which the uneven surface region is formed, to be discriminated from the other surface of the housing 12. Therefore, the presence of the uneven surface region is capable of being recognized with the tactile impression. As a result, the front surface and the back surface of the housing 12 are capable of being accurately discriminated from each other. Accordingly, in cases where the magnetic disk cartridge 10 is picked up between the fingers and inserted into the disk drive 6, the problems are capable of being prevented from occurring in that the magnetic disk cartridge 10 is inserted into the disk drive 6 in an incorrect orientation with respect to the front and back surfaces of the magnetic disk cartridge 10.

Furthermore, with this embodiment of the magnetic disk cartridge 10, the housing corner area, which is defined by the two side walls 21 and 22 of the housing 12, is located at the position spaced away from the outer circumference of the magnetic disk 14. Therefore, the position adjusting reference hole 16, which passes vertically through the housing 12, is capable of being formed at the corner area of the housing 12. Also, the identification piece 18, from which the information is capable of being read through, for example, reflection of light, transmission of light, or transmission of light having specific wavelengths, is capable of being embedded later into the hole 17 at the corner area of the housing 12. In such cases, since the recording capacity of the magnetic disk 14 accommodated in the housing 12, or the like, is capable of being discriminated by use of the identification piece 18, the advantages are capable of being obtained in that the housings are capable of being utilized commonly.

Also, with this embodiment of the magnetic disk cartridge 10, the housing 12 is constituted of the lower shell 20 and the upper shell 30, which is fitted into the side inward from the lower shell 20 and from above, and all of the constituent elements constituting the magnetic disk cartridge 10, except for the cover plate 41 which is adhered to the circular protruding region 37 of the upper shell 30, are assembled through fitting processed within the lower shell 20 with the laying-up technique. Therefore, the magnetic disk cartridge 10 has the advantages in that the magnetic disk cartridge 10 having the small size is capable of being assembled with a high efficiency.

Further, with this embodiment of the magnetic disk cartridge 10, the lower shell 20, the upper shell 30, the cover plate 41, the lower shutter 25, and the upper shutter 35 are made from metals and are assembled with the laying-up technique. Therefore, when the magnetic disk cartridge 10 is to be scrapped, the metal materials and the plastic materials are capable of being separated from each other. Accordingly, the effects of preventing environmental pollution are capable of being obtained.

Figure 8:
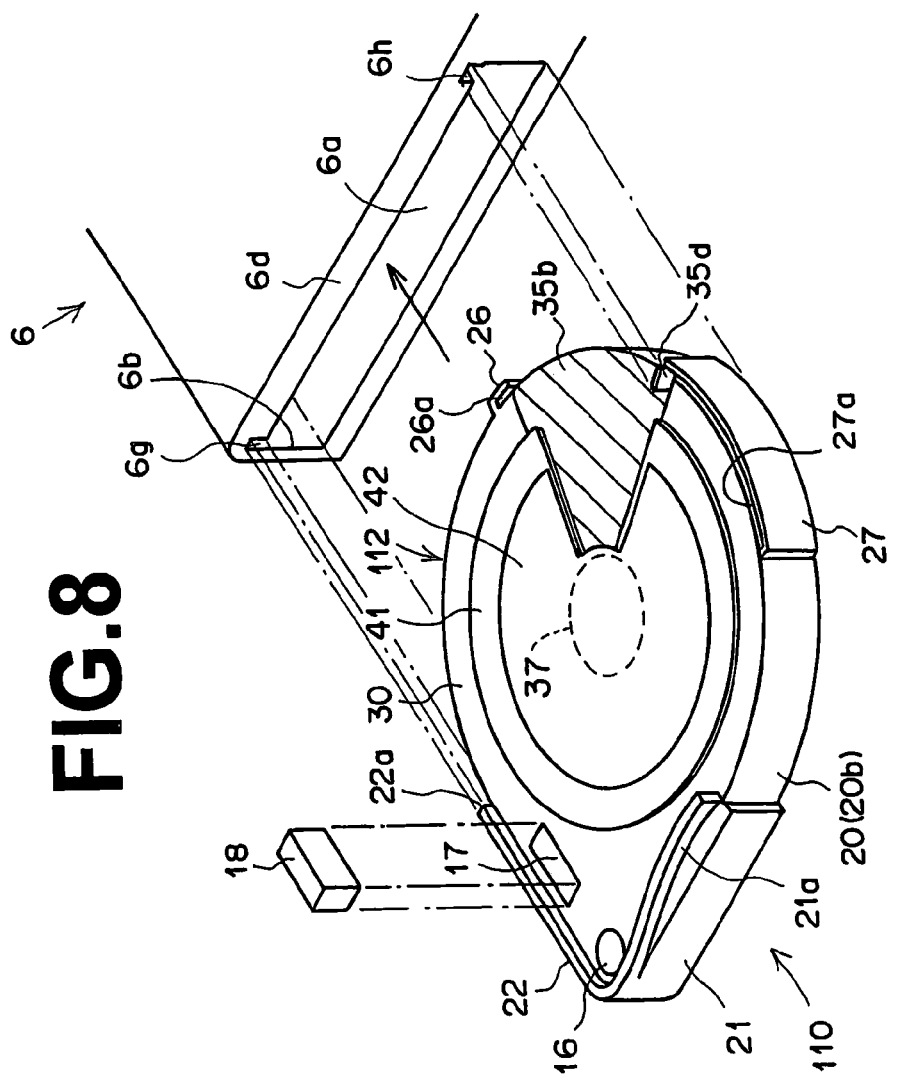
FIG. 8 is a perspective view, similar to FIG. 2, showing a second embodiment of the magnetic disk cartridge in accordance with the present invention.
Figure 9:
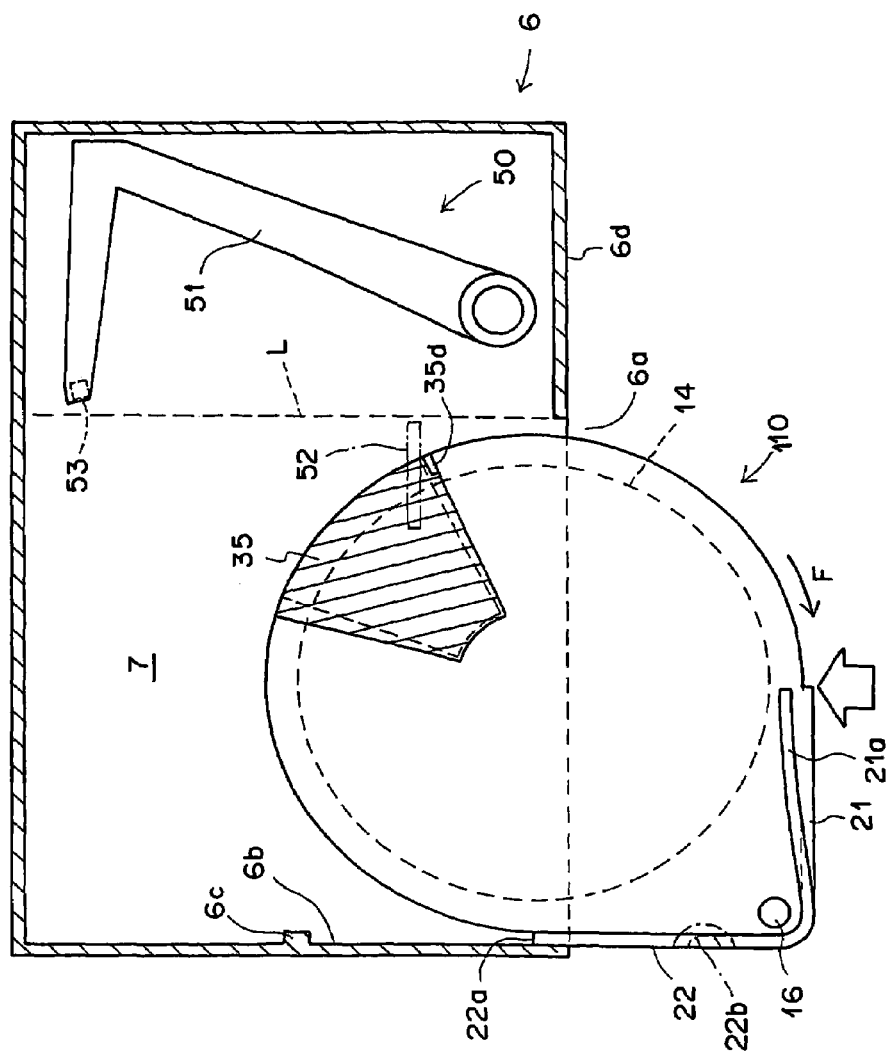
FIG. 9 is a schematic plan view showing the magnetic disk cartridge of FIG. 8 in a state in which the magnetic disk cartridge is being inserted into a disk drive.
Figure 10:
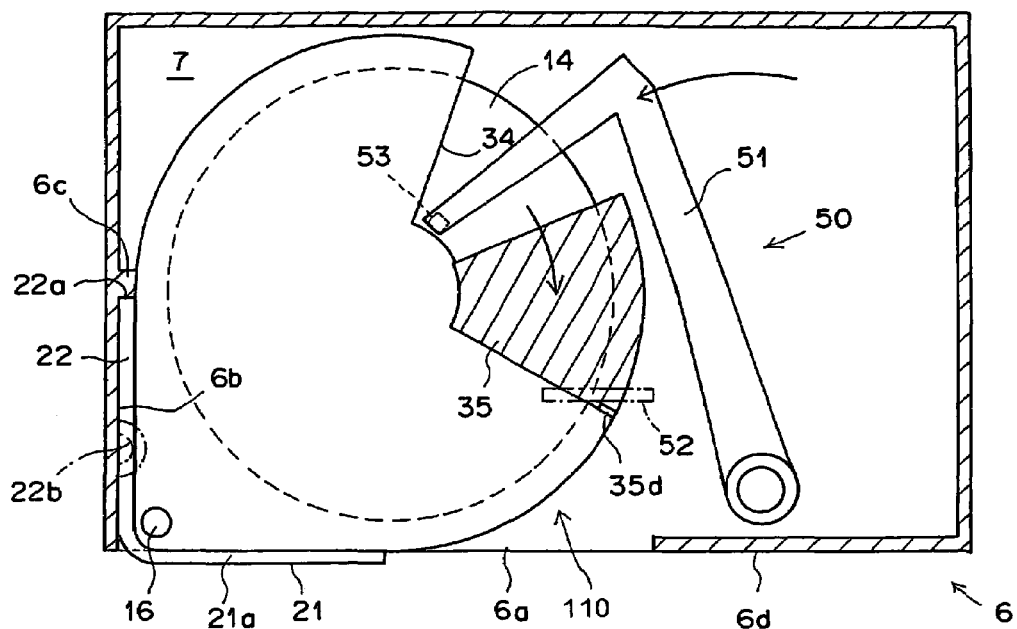
FIG. 10 is a schematic plan view showing the magnetic disk cartridge of FIG. 8 in a state in which the magnetic disk cartridge has been loaded into the disk drive.

A second embodiment of the magnetic disk cartridge in accordance with the present invention, wherein part of the magnetic disk cartridge 10 described above is altered, will be described hereinbelow with reference to FIG. 8, FIG. 9, and FIG. 10. FIG. 8 is a perspective view, similar to FIG. 2, showing the second embodiment of the magnetic disk cartridge in accordance with the present invention. FIG. 9 is a schematic plan view, similar to FIG. 6, showing the magnetic disk cartridge of FIG. 8 in a state in which the magnetic disk cartridge is being inserted into a disk drive. FIG. 10 is a schematic plan view, similar to FIG. 7, showing the magnetic disk cartridge of FIG. 8 in a state in which the magnetic disk cartridge has been loaded into the disk drive.

As illustrated in FIG. 8 and FIG. 10, in the second embodiment of the magnetic disk cartridge in accordance with the present invention, a leaf spring region 21a is formed at the top region of the side wall 21, which is formed at the end area of a housing 112 on the trailing side with respect to the direction of insertion of a magnetic disk cartridge 110 into the disk drive 6, the side wall 21 extending in a straight line in the direction, which is normal to the direction of insertion of the magnetic disk cartridge 110 into the disk drive 6, the top edge of the side wall 21 being projected upwardly from the top surface of the surface plate section of the housing 112. The leaf spring region 21a is formed by horizontally cutting the top region of the side wall 21 from the end of the side wall 21, which end is opposite to the corner area of the housing 112, toward the corner area of the housing 112. As illustrated in FIG. 9, a free end of the leaf spring region 21a is deviated toward the center area of the housing 112. When force is applied to the leaf spring region 21a in a direction, which causes the leaf spring region 21a to shift to the position coinciding with the position of the side wall 21, the leaf spring region 21a is deflected elastically and is imparted with the urging force.

The second embodiment of the magnetic disk cartridge in accordance with the present invention is constituted basically in the same manner as that for the first embodiment described above, except that the leaf spring region 21*a* is formed at the top region of the side wall 21. In the second embodiment, as illustrated in FIG. 9, slightly before the end of the process for inserting the magnetic disk cartridge 110 into the disk drive 6, the leaf spring region 21*a* of the side wall 21 of the housing 112 comes into elastic abutment with an outer wall surface 6*d* of the disk drive 6, which outer wall surface extends along the top edge of the cartridge receiving slot 6*a* of the disk drive 6. Therefore, leaf spring region 21*a* is elastically deflected by the outer wall surface 6*d* of the disk drive 6. As illustrated in FIG. 10, in the state in which the magnetic disk cartridge 110 has been completely inserted into the disk drive 6, the leaf spring region 21*a* is shifted to the position coinciding with the position of the side wall 21. In this state, the position adjusting projection (not shown) of the disk drive 6 engages into the position adjusting reference hole 16 of the magnetic disk cartridge 110. Also, when necessary, the position adjusting projection (not shown) of the disk drive 6 engages into the position adjusting recess 22*b*, which is formed in the side wall of the housing 112. In this manner, the magnetic disk cartridge 110 is set through engagement at the predetermined position within the disk drive 6. Also, the upper and lower rotating arms 51, 51 of the head assembly 50 are rotated counter-clockwise in FIG. 10, and the magnetic heads 53, 53 thus access the surfaces of the magnetic disk 14.

In this state, the magnetic disk cartridge 110 is urged toward the discharging direction by the elastic restoring force of the leaf spring region 21*a* of the magnetic disk cartridge 110. Also, since the magnetic disk cartridge 110 is urged toward the discharging direction by the elastic restoring force of the leaf spring region 21*a* of the magnetic disk cartridge 110, when the magnetic disk cartridge 110 is released from the engagement with the disk drive 6 at the time at which the magnetic disk cartridge 110 is to be taken out of the disk drive 6, the magnetic disk cartridge 110 is pushed out toward the discharging direction by the elastic restoring force of the leaf spring region 21*a*.

As described above, with the second embodiment, the magnetic disk cartridge 110 is set through the engagement at the predetermined position within the disk drive 6 in the state in which the magnetic disk cartridge 110 is urged toward the discharging direction by the elastic restoring force of the leaf spring region 21*a* of the housing 112. Therefore, the magnetic disk cartridge 110 is retained at the predetermined position within the disk drive 6 without any looseness of engagement with respect to the disk drive 6. Also, the releasability of the magnetic disk cartridge 110 from the disk drive 6 is enhanced.

Alternatively, in lieu of the leaf spring region 21*a*, any of other means may be employed as the urging means for urging the magnetic disk cartridge 110 toward the discharging direction.

Figure 11:
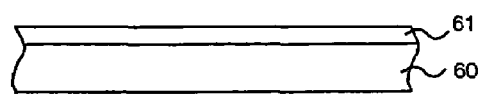
FIG. 11 is a cross-sectional view showing part of a housing of a magnetic disk cartridge, in which an emetic agent layer containing an emetic agent as a major constituent is formed on a surface of the housing of the magnetic disk cartridge.
Figure 12:
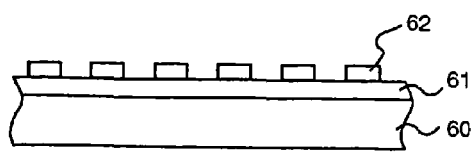
FIG. 12 is a cross-sectional view showing part of a housing of a magnetic disk cartridge, in which a protective layer is formed on the emetic agent layer shown in FIG. 11.

FIG. 11 is a cross-sectional view showing part of a housing 60 of a magnetic disk cartridge, in which an emetic agent layer 61 containing an emetic agent as a major constituent is formed on a surface of the housing 60 of the magnetic disk cartridge. FIG. 12 is a cross-sectional view showing part of the housing 61 of the magnetic disk cartridge, in which a protective layer 62 is formed on the emetic agent layer 61 shown in FIG. 11.

As illustrated in FIG. 11, the emetic agent layer 61 containing the emetic agent as a major constituent may be formed on the entire area of the surface of the housing 60 of the magnetic disk cartridge in accordance with the present invention. Also, as illustrated in FIG. 12, the emetic agent layer 61 containing the emetic agent as a major constituent may be formed on the entire area of the surface of the housing 60 of the magnetic disk cartridge in accordance with the present invention, and the protective layer 62 may be formed on the emetic agent layer 61, such that the protective layer 62 partially covers the emetic agent layer 61.

Figure 13:
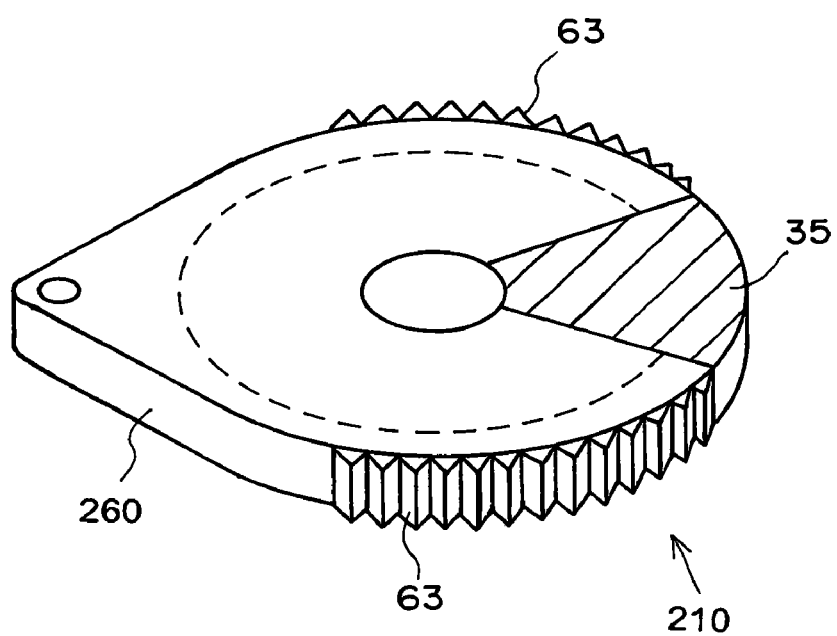
FIG. 13 is a perspective view showing a magnetic disk cartridge, in which means for amplifying a feeling of a foreign body, the feeling being given when the magnetic disk cartridge is taken into a mouth, is formed on a surface of a housing.

Further, as illustrated in FIG. 13, jagged regions 63, 63 may be formed on a surface of a housing 260 of a magnetic disk cartridge 210. When the magnetic disk cartridge 210 is taken into a mouth, the jagged regions 63, 63 amplify a feeling of a foreign body, which feeling is given to the mouth. Furthermore, the emetic agent layer, which contains the emetic agent as a major constituent, and/or the protective layer may be formed on the surface of the housing 260 of the magnetic disk cartridge 210.

In order to prevent the emetic agent from adhering to the hands, the fingers, and the like, of the user, as illustrated in FIG. 12, the protective layer 62 for partially covering the emetic agent layer 61 should preferably be formed on the emetic agent layer 61, which has been formed on the surface of the housing 60.

Specifically, firstly, for example, an emetic agent coating composition, which contains the emetic agent as a main constituent, may be applied onto the entire area of the surface of the housing 60, and the emetic agent layer 61 may thereby be formed on the surface of the housing 60. Alternatively, the housing may be formed from a resin material containing the emetic agent, and the housing may thus be provided with an emetic agent layer. (In such cases, in the strict sense, the emetic agent layer is not overlaid on the surface of the housing, but the housing itself also acts as the emetic agent layer. In the magnetic disk cartridge in accordance with the present invention, The thus formed emetic agent layer is also embraced in the scope of the emetic agent layer employed in the magnetic disk cartridge in accordance with the present invention.) Thereafter, the protective layer 62, which partially covers the emetic agent layer 61, may be formed on the emetic agent layer 61 with a coating process or a printing process, such as plain mesh printing or silk screen printing.

As described above, the protective layer 62 is partially formed on the emetic agent layer 61 having been overlaid on the surface of the housing 60. Therefore, in cases where the magnetic disk cartridge having been subjected to the emetic agent processing is taken into the mouth of an infant, or the like, or is licked, the emetic agent comes into contact with the tongue of the infant and gives a feeling of inducing vomiting to the infant. Also, in cases where the magnetic disk cartridge having been subjected to the emetic agent processing is picked up with a hand, the protective layer 62 prevents the emetic agent, which is contained in the emetic agent layer 61, from sticking to the hand, the fingers, and the like. Further, since the protective layer 62 is formed partially, the friction coefficient of the surface of the protective layer 62 is capable of being kept small, and the sliding characteristics of the magnetic disk cartridge in a conveyance path are capable of being enhanced.

In the cases of FIG. 11 and FIG. 12, the emetic agent layer 61 is formed over the entire area of the surface of the housing 60. Alternatively, a certain area of the surface of the housing 60 may not be provided with the emetic agent layer. The emetic agent layer, which is partially formed on the surface of the housing 60, may be formed with a process, wherein the emetic agent is added to a pigment of a printing ink, and the printing ink is printed partially on the surface of the housing 60. Alternatively, the emetic agent layer, which is partially formed on the surface of the housing 60, may be formed with a process, wherein an emetic agent coating composition containing the emetic agent as a main constituent is applied onto the surface of the housing 60, on which a mask has been placed partially, and the mask is thereafter removed.

The proportion of the area of the surface of the housing 60, which area is not provided with the emetic agent layer, should preferably fall within the range of 50% to 75% with respect to the surface area of the emetic agent layer. Also, the proportion of the area of the protective layer 62 should preferably fall within the range of 50% to 75% with respect to the surface area of the emetic agent layer. In cases where the proportion of the area of the surface of the housing 60, which area is not provided with the emetic agent layer, and the proportion of the area of the protective layer 62 fall within the ranges described above, when the magnetic disk cartridge having been subjected to the emetic agent processing is taken into the mouth of an infant, or the like, or is licked, the emetic agent contained in the emetic agent layer is capable of being discharged sufficiently from the emetic agent layer. The emetic agent thus gives a stimulus to the infant and causes the infant to vomit the magnetic disk cartridge from the mouth unconsciously. Accordingly, the problems are capable of being prevented from occurring in that the infants swallow or bite the magnetic disk cartridge by mistake. Also, since the stimulus of the emetic agent causes the infant to vomit the magnetic disk cartridge immediately, the problems are capable of being prevented from occurring in that the saliva, or the like, adheres to the recording surface of the magnetic disk cartridge, and an error in recording and reproduction of information occurs.

The emetic agent may be selected from various kinds of agents, which have the emetic effects when being taken into a mouth. For example, the emetic agent may be selected from bitter-taste emetic agents, sharp-taste emetic agents, and sour-taste emetic agents. From the view point of the emetic effects, it is considered that the bitter-taste emetic agents are particularly effective.

No limitation is imposed upon the kinds of the raw materials for the bitter-taste emetic agents. However, for example, aqueous extracts obtained from plants, fungi, and the like, which contain bitter-taste constituents, are preferable. Also, when the purposes of blending are taken into consideration, materials, which have been utilized or allowed to be used as food additives, are preferable. Examples of the materials containing bitter-taste constituents include plants of the mulberry family, plants of the family Rubiaceae, plants of the camellia family, plants of the family Polyporaceae, plants of the rose family, plants of the family Rutaceae, plants of the gentian family, plants of the Chinese parasol family, plants of the Japanese bitter wood family, plants of the composite family, basidiomycetes, woody vines of the family Menispermaceae, baker's yeasts, plants of the beefsteak plant family, spices of the flux family, and spices of the dropwort family. Specifically, examples of the materials containing the bitter-taste constituents include flowers of hops (the mulberry family); coffee beans (seeds), cortices of *cinchonasuccilbla* (the family Rubiaceae); leaves of tea plants, such as refined green tea, green tea of middle grade, tea of inferior quality, and mate (the camellia family); fruit bodies and mycelia of "kawaratake" mushroom, fruit bodies and mycelia of a bracket fungus of the genus *Fomes* (the family Polyporaceae); cortices of *Quilaja Saponaria* (the rose family); cortex of an Amur cork or plants of the same genus as the Amur cork, the rind of a bitter orange, the rind and seeds of grapefruit (the family Rutaceae); gentian roots and gentian rootstocks (the gentian family); cacao beans, cola seeds (the Chinese parasol family); cortices and the xylem of Japanese bitter wood (the Japanese bitter wood family); entire regions of a wormwood, stalks and leaves of a mugwort (the composite family); fruit bodies and mycelia of a "hime-matsutake" mushroom (basidiomycetes); stalks of woody vines of the family Menispermaceae; stalks and leaves of *Isodon japonicus Hara* (the beefsteak plant family); flux seeds acting as spices (the flux family); and roots and resins of asafetida, seeds of ajowan, and anise (the dropwort family).

Examples of the constituents of the bitter-taste emetic agents include the compounds, such as terpenes, xanthine derivatives, alkaloids, terpene glycosides, and triterpenoid derivatives. Specifically, examples of the constituents of the bitter-taste emetic agents include benzoic acid denatonium salts, octa-acetylated sucrose, hops, caffeine, "kawaratake" mushroom extracts, chrysanthemum extracts, Amur cork extracts, spice extracts, "hime-matsutake" mushroom extracts, extracts of the bracket fungus of the genus *Fomes*, naringin enzyme treatment products, dimethoxstrychnine brucine (brucine), humulone, lupulone, isohumulone, luputrion, natural caffeine, synthetic caffeine, quinine, quinidine, cinchonine, tannin, quillaiasaponin, quillaiasapogenin, quillaic acid, berberine, gentiopicrin, limonin, theobromine, naringin, flavanone, quassin, neo-quassin, nigaki lactone A~L, nigakinone, picracine A~G, methyl nigakinone, absinthin, borapetcide, boraptol, methylthio adenosine, and caffetannin.

In cases where the aqueous extracts obtained from the plants, and the like, described above are utilized as the constituents of the bitter-taste emetic agents, no limitation is imposed upon how the extraction is performed, and one of known aqueous extraction techniques may be employed. For example, after a raw wood, or the like, is dried and crushed, the necessary constituent is extracted by the addition of water or hot water, and the extraction liquid is subjected to filtration. When necessary, the extraction liquid is then subjected to purification. Thereafter, the extraction liquid is concentrated, and the extract is caused to precipitate. The extract is then dried. The dry extract is utilized directly or through standardization as the bitter-taste emetic substance.

As the bitter-taste emetic agent, it is also possible to employ an amino acid, such as 4-(2-carboxy-2-hydroxyethylthio)-2-piperidine carboxylic acid, which may be represented by the formula shown below. The compound shown below is extracted from the ovary of an echinoid and has a bitter taste.

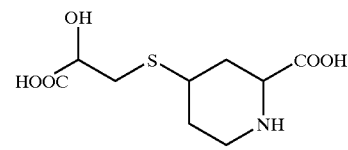

The compound represented by the formula shown above has two carboxyl groups. At least either one of the two carboxyl groups may be esterified with a lower alkyl group, such as a methyl group, an ethyl group, a propyl group, an isopropyl group, a butyl group, an isobutyl group, or a tertial butyl group. Also, the compound represented by the formula shown above may be an isomer. Further, the compound represented by the formula shown above may be a salt with an inorganic ion of an alkali metal, such as sodium or potassium, an alkaline earth metal, such as magnesium or calcium, one of the other typical metals, or a transition metal, such as iron, cobalt, or nickel. Alternatively, the compound represented by the formula shown above may be a salt with abase, such as ammonium, isopropylamine, triethylamine, or pyridine.

The bitter-taste emetic substances enumerated above may be utilized alone, or two or more substances among the bitter-taste emetic substances enumerated above may be utilized in combination. Particularly, as the bitter-taste emetic agents, denatonium saccharide (Vitlex, supplied by Macfarlan Smith Co., Ltd.), a benzoic acid denatonium salt, such as denatonium benzoate (Super Vilex, supplied by Burlington Biomedical & Science Co., Ltd.), and dimethoxstrychnine brucine (brucine) are preferable for the advantages in that the emetic agents have large bitter-taste emetic effects, have no adverse effects on the smell and the color, and exhibit no change in stability in the presence of a perfume, coloring matter, and an activator.

The proportion of the bitter-taste emetic agents should preferably fall within the range of 0.005% by weight (50 ppm) to 5% by weight with respect to the total amount of the emetic agent coating composition. The proportion of the bitter-taste emetic agents should more preferably fall within the range of 0.01% by weight (50 ppm) to 1% by weight with respect to the total amount of the emetic agent coating composition.

In order for the bitter taste to be strengthened, a substance, which is capable of imparting sweetness to the bitter-taste emetic substance, may be added in a predetermined amount to the bitter-taste emetic agent. No limitation is imposed upon the kind of the sweetness-imparting substance, which may be utilized in combination with the bitter-taste emetic agent. From the view point of the purposes of use, the sweetness-imparting substance should preferably be selected from pharmaceutical preparation additives, food additives, and the like, which are utilized as sweetening agents and taste rectifying agents for imparting sweetness. Examples of the sweetness-imparting substances include aspartame, hydrangea leaves, powdered hydrangea leaves, aminoacetic acid, isomerized sugar, liquid-state grape sugar, liquid sugar, fruit sugar, reducing malt sugar starch syrup, licorice, a licorice extract, a crude licorice extract, powdered licorice, xylitol, (conc.) glycerol, a glycyrrhizic acid dipotassium salt, a glycyrrhizic acid disodium salt, a glycyrrhizic acid monoammonium salt, black sugar, high-grape sugar starch syrup, saccharin, a saccharin sodium salt, sanfract, refined white sugar, spherical granules of refined white sugar, refined honey, D-sorbitol, D-sorbitol liquid, simple syrup, lactose, white sugar, honey, grape sugar, starch syrup of powdered reducing malt sugar, maltitol, maltose, maltrup-70, D-mannitol, starch syrup, ascorbic acid, L-aspartic acid, an L-aspartic acid sodium salt, an L-aspartic acid magnesium salt, a hydrangea leave extract, aminoethyl sulfonic acid, DL-alanine, a 5'-inosinic acid disodium salt, fennel fruit, powdered fennel fruit, fennel oil, erythritol, sodium chloride, magnesium chloride, hydrochloric acid, glutamic acid hydrochloride, eugenol, powdered phellodendron bark, an "ouhi" extract, Japanese coptis, powdered Japanese coptis, orange, orange oil, powdered cacao, gargle micron ZD-3586, caramel, carbachol, dry yeast, d-camphor, dl-camphor, dilutehydrochloric acid, D-xylose, a 5'-guanylic acid disodium salt, citric acid, a citric acid sodium salt, glycyrrhizic acid, a glycyrrhizic acid trisodium salt, a glycyrrhizic acid diammonium salt, glucono-δ-lactone, L-glutamic acid, an L-glutamic acid L-arginine salt, an L-glutamic acid sodium salt, a *Chlorella* extract, powdered *Chlorella*, powdered cinnamon, cinnamon oil, a succinic acid monosodium salt, a succinic acid disodium salt, powdered tang, acetic acid, crocus, methyl salicylate, powdered zanthoxylum fruit, β-cyclodextrin, powdered wild Siamese cardamom, D-tartaric acid, tartaric acid, potassium hydrogentartrate, a DL-tartaric acid sodium salt, powdered edible carrot, cinnamaldehyde, stearic acid, Japanese chirata, powdered Perilla herb, soybean oil, powdered Jujube, sodium hydrogencarbonate, tannic acid, thymol, medium-chain fatty acid triglyceride, clove oil, Citrus Unshiu Peel tincture, Guinea pepper, Guinea pepper tincture, sodium copper chlorophyllin, bitter orange peel tincture, powdered bitter orange peel, peppermint water, peppermint oil, pialex, chocolate, glacial acetic acid, a pyrophosphoric acid tetrasodium salt, wine, fumaric acid, a fumaric acid monosodium salt, powder sugar, Peru balsam, polyvinyl pyrrolidone K90, a myrrh fluid extract, anhydrous citric acid, an anhydrous pyrophosphoric acid sodium salt, methyl cellulose, cotton seed oil, dl-menthol, l-menthol, eucalyptus oil, borneol, powdered borneol, powdered green tea, a Ringer's solution, apple fruit juice, dl-malic acid, a dl-malic acid sodium salt, apple vinegar, concentrated apple fruit juice, lemon oil, rose oil, and royal jelly. The above-enumerated sweetness-imparting substances may be utilized alone, or two or more substances among the sweetness-imparting substances enumerated above may be utilized in combination.

Examples of preferable combinations of the bitter-taste emetic agents and the sweetness-imparting substances include combinations of at least one bitter-taste emetic agent selected from the group consisting of an aqueous extract of Japanese bitter wood, naringin, synthetic caffeine, and natural caffeine, and at least one sweetness-imparting substance selected from the group consisting of (conc.) glycerol, D-sorbitol, D-xylose, and D-mannitol. In order for the bitter taste to be strengthened, the weight ratio of the bitter-taste emetic substance to the sweetness-imparting substance should preferably fall within the range between 1:10 and 1:10,000. The weight ratio of the bitter-taste emetic substance to the sweetness-imparting substance should more preferably fall within the range between 1:100 and 1:10,000, and should most preferably fall within the range between 1:1,000 and 1:10,000.

Examples of the sour-taste emetic agents include citric acid, tartaric acid, lactic acid, acetic acid, glacial acetic acid, fumaric acid, a fumaric acid sodium salt, malic acid, and adipic acid. Examples of the sharp-taste emetic agents include piperine, chavicine, capsaicine, α-sanshool, β-sanshool, zingeron, shogaol, and isothiocyanic esters.

The emetic agent layer containing the emetic agent as a main constituent may also contain an anti-fungus agent and/or a perfume agent. In cases where the protective layer is formed on the emetic agent layer, the anti-fungus agent and/or the perfume agent may be contained in the protective layer. With the effects of the anti-fungus agent, the problems are capable of being prevented from occurring in that various bacteria increase in the emetic agent layer or protective layer. In cases where the anti-fungus agent is contained in the emetic agent layer, such that the cost may be kept low and sufficient anti-fungus effects may be obtained, the proportion of the anti-fungus agent should preferably fall within the range of 0.01% by weight to 10% by weight with respect to the total amount of the emetic agent coating composition for the formation of the emetic agent layer, depending on the kind of the anti-fungus agent or a combination of the anti-fungus agents. In cases where the anti-fungus agent is contained in the protective layer, such that the cost may be kept low and sufficient anti-fungus effects may be obtained, the proportion of the anti-fungus agent should preferably fall within the range of 0.01% by weight to 10% by weight with respect to the total amount of the protective layer coating composition for the formation of the protective layer, depending on the kind of the anti-fungus agent or a combination of the anti-fungus agents.

As the anti-fungus agent, any of known anti-fungus agents may be utilized. Examples of the anti-fungus agents include Zeomic (trade name) supplied by Shinanen Co., Ltd., 2-(4-thiazolyl)-benzimidazole, 2-benzimidazole methyl carbamate, 2-(methoxycarbonyl)benzimidazole, N-(fluorodichloromethylthio)-phthalimide, N,N-dimethyl-N'-(dichlorofluoromethyl)thio-N'-phenylsulfamide, 2-n-octyl-4-isothiazolin-3-on, 1,2-benzisothiazolin-3-on, bis(2-pyridylthiol-1-oxide)zinc, bis(2-pyridylthio-1-oxide)sodium, 2,3,5,6-tetrachloro-4-(methylsulfonyl)-pyridine, and 10,10'-oxybisphenoxarsine. The anti-fungus agents enumerated above may be utilized alone, or two or more anti-fungus agents among the anti-fungus agents enumerated above may be utilized in combination.

As the perfume constituents, synthetic perfume agents may be utilized. Examples of the synthetic perfume agents include hydrocarbons, such as aliphatic hydrocarbons, terpene hydrocarbons, and aromatic hydrocarbons; alcohols, such as aliphatic alcohols, terpene alcohols, and aromatic alcohols; ethers, such as aliphatic ethers and aromatic ethers; oxides, such as aliphatic oxides and oxides of terpenes; aldehydes, such as aliphatic aldehydes, terpene aldehydes, hydrogenated aromatic aldehydes, thio aldehydes, and aromatic aldehydes; ketones, such as aliphatic ketones, terpene ketones, hydrogenated aromatic ketones, aliphatic cyclic ketones, non-benzene aromatic ketones, and aromatic ketones; acetals; ketals; phenols; phenol ethers; acids, such as fatty acids, terpene carboxylic acids, hydrogenated aromatic carboxylic acids, and aromatic carboxylic acids; acid amides; lactones, such as aliphatic lactones, cyclic lactones, terpene lactones, hydrogenated aromatic lactones, and aromatic lactones; esters, such as aliphatic esters, carboxylic acid esters of furans, aliphatic cyclic carboxylic acid esters, and aromatic carboxylic acid esters; and nitrogen-containing compounds, such as nitro-musks, nitrites, amines, pyridine, quinoline, pyrrole, and indole. As the perfume constituents, natural perfume agents obtained from animals and plants, and blended perfume agents, which contain natural perfume agents and/or synthetic perfume agents, may also be utilized. The above-enumerated perfume constituents may be utilized alone, or two or more perfume constituents among the above-enumerated perfume constituents may be utilized in combination.

Specifically, preferable perfume agents are described in, for example, "Synthetic Perfume Chemistry & Commodity Knowledge" by Gen-ichi Ito, published by Kagaku Kogyo Nippo Co., Ltd., 1996; and "Perfume and Flavor Chemicals" by Steffenarctamder, 1069. In cases where the perfume constituent is contained in the emetic agent layer, the proportion of the perfume constituent should preferably fall within the range of 0.1% by weight to 10% by weight, preferably within the range of 0.4% by weight to 8% by weight, with respect to the total amount of the emetic agent coating composition for the formation of the emetic agent layer, depending on the kind of the perfume constituent or a combination of the perfume constituents. In cases where the perfume constituent is contained in the protective layer, the proportion of the perfume constituent should preferably fall within the range of 0.1% by weight to 10% by weight, preferably within the range of 0.4% by weight to 8% by weight, with respect to the total amount of the protective layer coating composition for the formation of the protective layer, depending on the kind of the perfume constituent or a combination of the perfume constituents.

In cases where the emetic agent layer is to be formed with the coating process, the emetic agent coating composition may be prepared by mixing the emetic agent, a resin, and materials which may be utilized when necessary, such as a solvent, the anti-fungus agent described above, the perfume agent described above, and other additives. The resulting mixture may be subjected to a known dispersing process, for example, a dispersing process with a dispersing machine, such as a three-roll mill or a horizontal ball mill.

As the resin to be utilized in the emetic agent coating composition, any of known resins may be utilized. Examples of the resins to be utilized in the emetic agent coating composition include acrylic resins, vinyl chloride resins, chlorinated polypropylene resins, unsaturated polyester resins, polyurethane resins, phenol resins, and urethane resins. The above-enumerated resins may be used alone, or two or more resins among the above-enumerated resins may be used in combination.

As the solvent, which may be utilized in the emetic agent coating composition, any of known solvents may be utilized. Examples of the solvents, which may be utilized in the emetic agent coating composition, include chain hydrocarbons, such as solvent naphtha, mineral spirit, and spindle oil; cyclic hydrocarbons, such as xylene, nitro benzene, decalin, tetralin, and cyclohexane; alcohols, such as normal propyl alcohol, isopropyl alcohol, benzyl alcohol, and cyclohexanol; esters, such as an acetic acid ethyl ester, an acetic acid butyl ester, an acetic acid amyl ester, and a benzoic acid amyl ester; ether alcohols, such as ethyl cellosolve, methyl cellosolve, and carbitol; glycols, such as ethylene glycol, propylene glycol, and glycerol; methyl ethyl ketone; cyclohexanone; and mesityl oxide. The above-enumerated solvents may be used alone, or two or more solvents among the above-enumerated solvents may be used in combination.

When necessary, other additives may be utilized. Examples of the other additives include fillers, such as calcium carbonate; plasticizers, such as a phthalic acid dibutyl ester, a phosphoric acid tricresyl ester, and a sebacic acid dimethyl ester; wax and grease, such as carnauba wax, bees wax, montan wax, and petrolatum; and driers, such as boric acid salts and naphthenic acid salts.

In cases where the emetic agent is added to a printing ink, and the printing ink is partially printed on the surface of the housing, a known pigment may be utilized in addition to the materials described above. The pigment may be an inorganic pigment or an organic pigment. Examples of the pigments, which may be utilized, include titanium oxide, zinc oxide, carbon black, black iron oxide, aniline black, Hansa Yellow, Benzidine Yellow, Tartrazine Lake, Permanent Yellow toner, cadmium yellow, Benzidine Orange, chrome vermilion, cadmium orange, Permanent Orange GTR, Fast Orange Lake, Lake Red C, red iron oxide, Watchung Red, Brilliant Carmine 6B, Permanent Red F5R, Permanent Red 2B, Permanent Red FRLL, Carmine Lake, Quinacridone Red, Methyl Violet Lake, Fast Violet B, Quinacridone Violet, Indanthrene Violet, Phthalocyanine Blue, Fast Sky Blue, Prussian blue, ultramarine, Victoria Blue Lake, Phthalocyanine Green, Malachite Green Lake, Pigment Green B, viridian, sienna, amber, aluminum powder, bronze powder, and fluorescent pigments.

As described above, with the embodiments of the magnetic disk cartridge in accordance with the present invention, the emetic agent layer 61 containing the emetic agent as a main constituent is formed on at least a certain area of the surface of the housing 60. Therefore, in cases where, for example, an infant takes the magnetic disk cartridge into the mouth or licks the magnetic disk cartridge by mistake or playfully, the emetic agent layer comes into contact with the tongue of the infant and gives a feeling of vomiting to the infant. The emetic agent contained in the emetic agent layer gives a stimulus to the infant and causes the infant to vomit the magnetic disk cartridge from the mouth unconsciously. Accordingly, the problems are capable of being prevented from occurring in that the infants swallow or bite the magnetic disk cartridge by mistake. Also, in cases where the means for amplifying a feeling of a foreign body, which feeling is given when the magnetic disk cartridge is taken into a mouth, is formed on at least a certain area of the surface of the housing, the means for amplifying a feeling of a foreign body gives a stimulus to the infant and causes the infant to vomit the magnetic disk cartridge from the mouth immediately. Accordingly, the problems are capable of being prevented from occurring in that the saliva, or the like, adheres to the recording surface of the magnetic disk cartridge, and an error in recording and reproduction of information occurs.

What is claimed is:

1. A magnetic disk cartridge capable of being loaded into a disk drive, the magnetic disk cartridge comprising:
   i) a housing, and
   ii) a magnetic disk, which is accommodated for rotation within the housing,
   wherein the housing is provided with an opening, which allows a magnetic head of the disk drive to access a surface of the magnetic disk, and a shutter for opening and closing the opening, and
   the housing has an outer peripheral shape composed of a circular arc, which is formed along a contour of the magnetic disk, and two straight lines, which are circumscribed with the circular arc formed along the contour of the magnetic disk and are normal to each other.

2. A magnetic disk cartridge as defined in claim 1 wherein the housing is provided with two side walls, each of which extends along one of the two straight lines that are normal to each other,
   one of the two side walls of the housing extends in a direction, which is normal to a direction of insertion of the magnetic disk cartridge into the disk drive, and
   the other side wall of the housing extends in parallel with the direction of insertion of the magnetic disk cartridge into the disk drive.

3. A magnetic disk cartridge as defined in claim 2 wherein the one side wall of the housing, which side wall extends in the direction normal to the direction of insertion of the magnetic disk cartridge into the disk drive, is formed at an end area of the housing on a trailing side with respect to the direction of insertion of the magnetic disk cartridge into the disk drive, and
   a dimension of the one side wall of the housing, which dimension is taken in a direction parallel with an axis of rotation of the magnetic disk, is larger than a thickness of a magnetic disk accommodating section of the housing.

4. A magnetic disk cartridge as defined in claim 3 wherein a dimension of the other side wall of the housing, the side wall extending in parallel with the direction of insertion of the magnetic disk cartridge into the disk drive, which dimension is taken in the direction parallel with the axis of rotation of the magnetic disk, is larger than the thickness of the magnetic disk accommodating section of the housing.

5. A magnetic disk cartridge as defined in claim 4 wherein bottom edges of the two side walls of the housing are in the same plane as a bottom surface of a surface plate section of the housing, and
   top edges of the two side walls of the housing are projected above a top surface of the surface plate section of the housing.

6. A magnetic disk cartridge as defined in claim 2 wherein an outer surface of each of the two side walls of the housing is slightly projected outwardly from a line circumscribed with an outer circumferential surface of a circumferential wall of the housing, the circumferential wall forming the circular arc formed along the contour of the magnetic disk, the circumscribed line being taken at a position on the outer circumferential surface, the position is adjacent to each of the outer surfaces of the two side walls of the housing.

7. A magnetic disk cartridge as defined in claim 6 wherein a corner area, which is formed between the two side walls of the housing, is formed at a corner of the housing on a trailing side with respect to the direction of insertion of the magnetic disk cartridge into the disk drive.

8. A magnetic disk cartridge as defined in claim 7 wherein the housing is constituted of a lower shell and an upper shell, which is fitted into the side inward from the lower shell and from above, and all of constituent elements constituting the magnetic disk cartridge are assembled within the lower shell with a laying-up technique.

9. A magnetic disk cartridge as defined in claim 8 wherein a lower shutter acting on the side of the lower shell is located on the side inward from the lower shell,
   an upper shutter acting on the side of the upper shell is located on the side outward from the upper shell, and
   the upper shell and the lower shell are coupled with each other on an anterior side of the opening of the housing and are capable of rotating together with each other.

10. A magnetic disk cartridge as defined in claim 9 wherein the magnetic disk is a high-recording-density magnetic recording medium, which utilizes barium ferrite particles.

11. A magnetic disk cartridge capable of being loaded into a disk drive, the magnetic disk cartridge comprising:
    i) a housing, and
    ii) a magnetic disk, which is accommodated for rotation within the housing,
    wherein the housing is provided with an opening, which allows a magnetic head of the disk drive to access a surface of the magnetic disk, and a shutter for opening and closing the opening,
    wherein the housing has an outer peripheral shape composed of a circular arc, which is formed along a contour of the magnetic disk, and two straight lines, which are circumscribed with the circular arc formed along the contour of the magnetic disk and are normal to each other, and
    wherein the housing is provided with urging means, which is located on a trailing side with respect to a direction of insertion of the magnetic disk cartridge into the disk drive, the urging means urging the magnetic disk cartridge toward a discharging direction in a state, in which the magnetic disk cartridge has been inserted into the disk drive and has been set through engagement at a predetermined position within the disk drive.

12. A magnetic disk cartridge as defined in claim 11 wherein the housing is provided with a side wall formed at an end area of the housing on a trailing side with respect to a direction of insertion of the magnetic disk cartridge into the disk drive, the side wall extending in a straight line in a direction, which is normal to the direction of insertion of the magnetic disk cartridge into the disk drive, a top edge of the side wall being projected upwardly from a top surface of a surface plate section of the housing, and the urging means is constituted of a leaf spring region, which is formed at a top region of the side wall such that, when the magnetic disk cartridge has been inserted into the disk drive, the leaf spring region abuts elastically with an outer wall surface of the disk drive, the outer wall surface extending along a top edge of a cartridge receiving slot of the disk drive.

13. A magnetic disk cartridge as defined in claim 12 wherein the magnetic disk is a high-recording-density magnetic recording medium, which utilizes barium ferrite particles.

14. A magnetic disk cartridge capable of being loaded into a disk drive, the magnetic disk cartridge comprising:

i) a housing, and ii) a magnetic disk, which is accommodated for rotation within the housing, wherein the housing is provided with an opening, which allows a magnetic head of the disk drive to access a surface of the magnetic disk, and a shutter for opening and closing the opening, wherein the housing has an outer peripheral shape composed of a circular arc, which is formed along a contour of the magnetic disk, and two straight lines, which are circumscribed with the circular arc formed along the contour of the magnetic disk and are normal to each other, and wherein an uneven surface region is formed on at least either one of a front surface and a back surface of the housing, the uneven surface region enabling the one surface, on which the uneven surface region is formed, to be discriminated from the other surface of the housing.

15. A magnetic disk cartridge as defined in claim 14 wherein the uneven surface region is formed by performing matting processing on the one surface of the housing.

16. A magnetic disk cartridge as defined in claim 14 wherein the uneven surface region is formed by attaching a label to a certain area of the one surface of the housing.

17. A magnetic disk cartridge as defined in claim 16 wherein the magnetic disk is a high-recording-density magnetic recording medium, which utilizes barium ferrite particles.

18. A magnetic disk cartridge capable of being loaded into a disk drive, the magnetic disk cartridge comprising:

i) a housing, and ii) a magnetic disk, which is accommodated for rotation within the housing, wherein the housing is provided with an opening, which allows a magnetic head of the disk drive to access a surface of the magnetic disk, and a shutter for opening and closing the opening, wherein the housing has an outer peripheral shape composed of a circular arc, which is formed along a contour of the magnetic disk, and two straight lines, which are circumscribed with the circular arc formed along the contour of the magnetic disk and are normal to each other, and wherein an emetic agent layer, which contains an emetic agent as a major constituent, is formed on at least a certain area of a surface of the housing.

19. A magnetic disk cartridge capable of being loaded into a disk drive, the magnetic disk cartridge comprising:

i) a housing, and ii) a magnetic disk, which is accommodated for rotation within the housing, wherein the housing is provided with an opening, which allows a magnetic head of the disk drive to access a surface of the magnetic disk, and a shutter for opening and closing the opening, wherein the housing has an outer peripheral shape composed of a circular arc, which is formed along a contour of the magnetic disk, and two straight lines, which are circumscribed with the circular arc formed along the contour of the magnetic disk and are normal to each other, and wherein means for amplifying a feeling of a foreign body, which feeling is given when the magnetic disk cartridge is taken into a mouth, is formed on at least a certain area of a surface of the housing.

20. A magnetic disk cartridge as defined in claim 19 wherein an emetic agent layer, which contains an emetic agent as a major constituent, is formed on at least a certain area of a surface of the housing.

* * * * *